(12) United States Patent
Siriwardane et al.

(10) Patent No.: US 12,319,575 B2
(45) Date of Patent: Jun. 3, 2025

(54) PROCESS FOR PRODUCTION OF HYDROGEN WITH TRANSPORT FROM CHEMICAL LOOPING USING MIXTURE OF PARTIAL OXIDATION OXYGEN CARRIERS AND COMBUSTION OXYGEN CARRIERS

(71) Applicant: United States Department of Energy, Washington, DC (US)

(72) Inventors: Ranjani Siriwardane, Morgantown, WV (US); Jarrett Riley, Morgantown, WV (US)

(73) Assignee: United States Department of Energy, Washington, DC (US)

(*) Notice: Subject to any disclaimer, the term of this patent is extended or adjusted under 35 U.S.C. 154(b) by 801 days.

(21) Appl. No.: 17/574,347

(22) Filed: Jan. 12, 2022

(65) Prior Publication Data

US 2022/0219976 A1    Jul. 14, 2022

Related U.S. Application Data

(60) Provisional application No. 63/137,476, filed on Jan. 14, 2021.

(51) Int. Cl.
| | |
|---|---|
| *C01B 3/38* | (2006.01) |
| *B01J 23/78* | (2006.01) |
| *B01J 23/889* | (2006.01) |
| *B01J 38/02* | (2006.01) |
| *C01B 3/40* | (2006.01) |

(52) U.S. Cl.
CPC ............. *C01B 3/386* (2013.01); *B01J 23/78* (2013.01); *B01J 23/8892* (2013.01); *B01J 38/02* (2013.01);

(Continued)

(58) Field of Classification Search
CPC .......... C01B 3/386; C01B 3/382; C01B 3/40; C01B 2203/0233; C01B 2203/0244;
(Continued)

(56) References Cited

U.S. PATENT DOCUMENTS

| | | |
|---|---|---|
| 9,421,537 B2 | 8/2016 | Idriss et al. |
| 10,030,204 B1 * | 7/2018 | Siriwardane ............. C10J 3/725 |
| 2014/0264177 A1 | 9/2014 | Meissner et al. |

FOREIGN PATENT DOCUMENTS

| | | | | |
|---|---|---|---|---|
| WO | WO-2011031755 A1 * | 3/2011 | ................ | B01J 7/00 |
| WO | WO-2020210865 A1 * | 10/2020 | ............ | B01J 19/245 |

OTHER PUBLICATIONS

Suzuki et al., Alkali metal catalyzed carbon dioxide gasification of carbon, Energy Fuels, Jul. 1, 1992, 6, 4, 343-351.

(Continued)

*Primary Examiner* — Anthony J Zimmer
*Assistant Examiner* — Abdul-Rahman Yusuf Waleed Smari
(74) *Attorney, Agent, or Firm* — Aaron R. Keith; Michael J. Dobbs

(57) ABSTRACT

The invention provides a process for producing hydrogen having the steps of reacting a fuel with a combination of two oxygen carriers to produce gaseous products and reduced oxygen carriers; reacting a portion of the reduced oxygen carriers with steam to generate hydrogen and partially oxidized oxygen carriers; and reacting the partially oxidized oxygen carriers and remaining reduced oxygen carriers with air to generate heat and regenerate the two oxygen carriers in their original oxidation state, wherein the heat and regenerated oxygen carriers are reused.

19 Claims, 19 Drawing Sheets

(52) U.S. Cl.
CPC ............... *C01B 3/382* (2013.01); *C01B 3/40* (2013.01); *C01B 2203/0233* (2013.01); *C01B 2203/0244* (2013.01); *C01B 2203/0261* (2013.01); *C01B 2203/0277* (2013.01); *C01B 2203/0811* (2013.01); *C01B 2203/1047* (2013.01); *C01B 2203/1076* (2013.01); *C01B 2203/1241* (2013.01)

(58) Field of Classification Search
CPC .... C01B 2203/0261; C01B 2203/0277; C01B 2203/0811; C01B 2203/1047; C01B 2203/1076; C01B 2203/1241; B01J 23/78; B01J 23/8892; B01J 38/02
See application file for complete search history.

(56) References Cited

OTHER PUBLICATIONS

Ohme et al., Mechanisms of CO2 Gasification of Carbon Catalyzed with Group VIII Metals. 1. Iron-Catalyzed CO2 Gasification, Energy Fuels, Jul. 18, 1996, 10, 4, 980-987.

Asami et al., Gasification of brown coal and char with carbon dioxide in the presence of finely dispersed iron catalysts, Fuel Processing Technology, May 1996, 2, 47, May 1886, 139-151.

Zhang et al., Catalytic CO2 gasification of a Powder River Basin coal, Fuel Processing Technology, Oct. 17, 2014, 130, 107-116.

Tanaka et al., CO2 Gasification of Iron-Loaded Carbons: Activation of the Iron Catalyst with CO, Energy Fuels, Jan. 1, 1995, 9, 1, 45-52.

Mondal et al., Dry reforming of methane to syngas: a potential alternative process for value added chemicals—a techno-economic perspective, Environ. Sci. Pollut. Res., 2016, 23, 22267-22273.

Jean-Michel Lavoie, Review on dry reforming of methane, a potentially more environmentally-friendly approach to the increasing natural gas exploitation, Frontiers in Chemistry, Nov. 11, 2014, 2, 1-17.

Jang et al., A review on dry reforming of methane in aspect of catalytic properties, Catalysis Today, 2019, 324, 15-26.

Riley et al., Particle scale modeling of CuFeAlO4 during reduction with CO in chemical looping applications, Applied Energy, 2019, 251, 113178.

* cited by examiner

PROCESS FOR PRODUCTION OF HYDROGEN WITH TRANSPORT FROM CHEMICAL LOOPING USING MIXTURE OF PARTIAL OXIDATION OXYGEN CARRIERS AND COMBUSTION OXYGEN CARRIERS

CROSS-REFERENCE TO RELATED APPLICATIONS

This Utility Patent Application claims priority benefit as a U.S. Non-Provisional of U.S. Provisional Patent Application Ser. No. 63/137,476, filed on Jan. 14, 2021, the entirety of which is incorporated by reference herein.

STATEMENT OF GOVERNMENT SUPPORT

The United States Government has rights in this invention pursuant to an employer/employee relationship between the inventors and the U.S. Department of Energy, operators of the National Energy Technology Laboratory (NETL).

FIELD OF THE INVENTION

One or more embodiments consistent with the present disclosure relate to a hydrogen production method. Specifically, the invention involves producing hydrogen from fuel using a chemical looping method utilizing two different oxygen carriers.

BACKGROUND

The hydrogen economy is growing. Two of the chemicals produced most every year, ammonia and methanol, both require hydrogen input. Oil refineries also use the gas to limit impurities in refined fuels. Further, as the demand for green energy rises, hydrogen is becoming more important for direct use in fuel cells or in combustion engines. As the need for hydrogen grows, so does the need for hydrogen production methods that reduce the output of pollutants and greenhouse gasses of current methods.

The domestic growth in natural gas and other fuel resources can play a significant role in a future hydrogen economy, but the carbon footprint and energy requirements for fossil-fuel hydrogen production need to be reduced. There is a need in the art for a method to produce hydrogen without the disadvantages of the prior art. The concept described below has the potential to utilize domestic natural gas and other fuel sources for hydrogen production in a sustainable process.

SUMMARY

Embodiments of the invention relate to materials and methods to generate hydrogen from a chemical looping method utilizing two oxygen carriers.

An embodiment of the invention uses a chemical looping system that leverages two oxygen carriers, wherein the first oxygen carrier is capable of partially oxidizing a fuel, wherein the first oxygen carrier is a group II metal ferrite oxygen carrier comprising $M_zFe_xO_y$, where $1 \leq z \leq 3$, $1 \leq x \leq 3$, and $3 \leq y \leq 5$, and where M is one of Mg, Ca, Ba, Sr (Group II alkali earth metals) and combinations thereof, wherein the second oxygen carrier is capable of fully combusting a fuel, and wherein the second oxygen carrier comprises of copper oxide, manganese oxide and iron oxide or a mixture thereof.

In embodiments of the invention, fuel reacts with two oxygen carriers to produce gaseous products and reduced oxygen carriers. In these embodiments, one portion of the reduced oxygen carriers is reacted with steam in a steam reactor to produce hydrogen and partially reduced oxygen carriers. Said partially reduced oxygen carriers are combined with remaining reduced oxygen carriers and reacted with air to produce heat and fully oxidized oxygen carriers, wherein both the heat and fully oxidized are reused in the reaction of fuel with oxygen carriers. An advantage of the instant invention is that it can leverage the heat produced in the reaction of oxygen carriers with air to provide the heat necessary for the reactions of fuel with oxygen carriers. As such, embodiments of the invention are autothermal.

The invention provides a method for producing hydrogen from a fuel comprising: reacting the fuel with a fully oxidized first oxygen carrier and a fully oxidized second carrier in a fuel reactor to produce gaseous products and a reduced first oxygen carrier and a reduced second oxygen carrier; removing a first portion of each of the reduced first oxygen carrier and the reduced second oxygen carrier from the fuel reactor and dividing said first portion into a second portion and a third portion; reacting the second portion with air in an air reactor to generate heat and a regenerated fully oxidized first oxygen carrier and a regenerated fully oxidized second oxygen carrier; transporting the regenerated fully oxidized first oxygen carrier and the regenerated fully oxidized second oxygen carrier and at least a portion of the heat from the air reactor to the fuel reactor; and reacting the third portion with steam in a steam reactor to generate hydrogen and a partially oxidized reduced first oxygen carrier and a partially oxidized second oxygen carrier.

BRIEF DESCRIPTION OF THE DRAWINGS

These and other features, aspects, and advantages of the multiple embodiments of the present invention will become better understood with reference to the following description, appended claims, and accompanied drawings where:

Figure 8A:
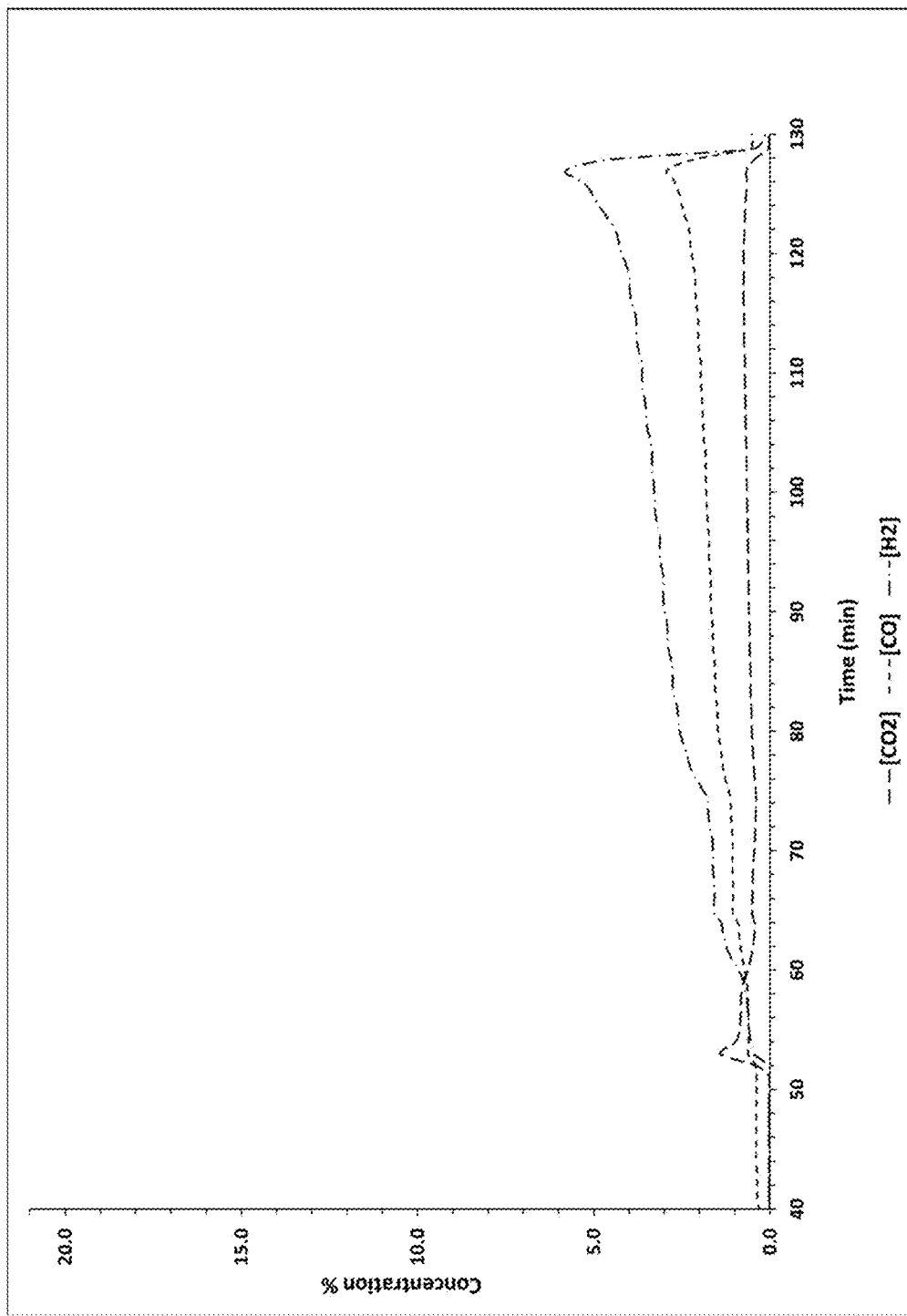
Figure 8B:
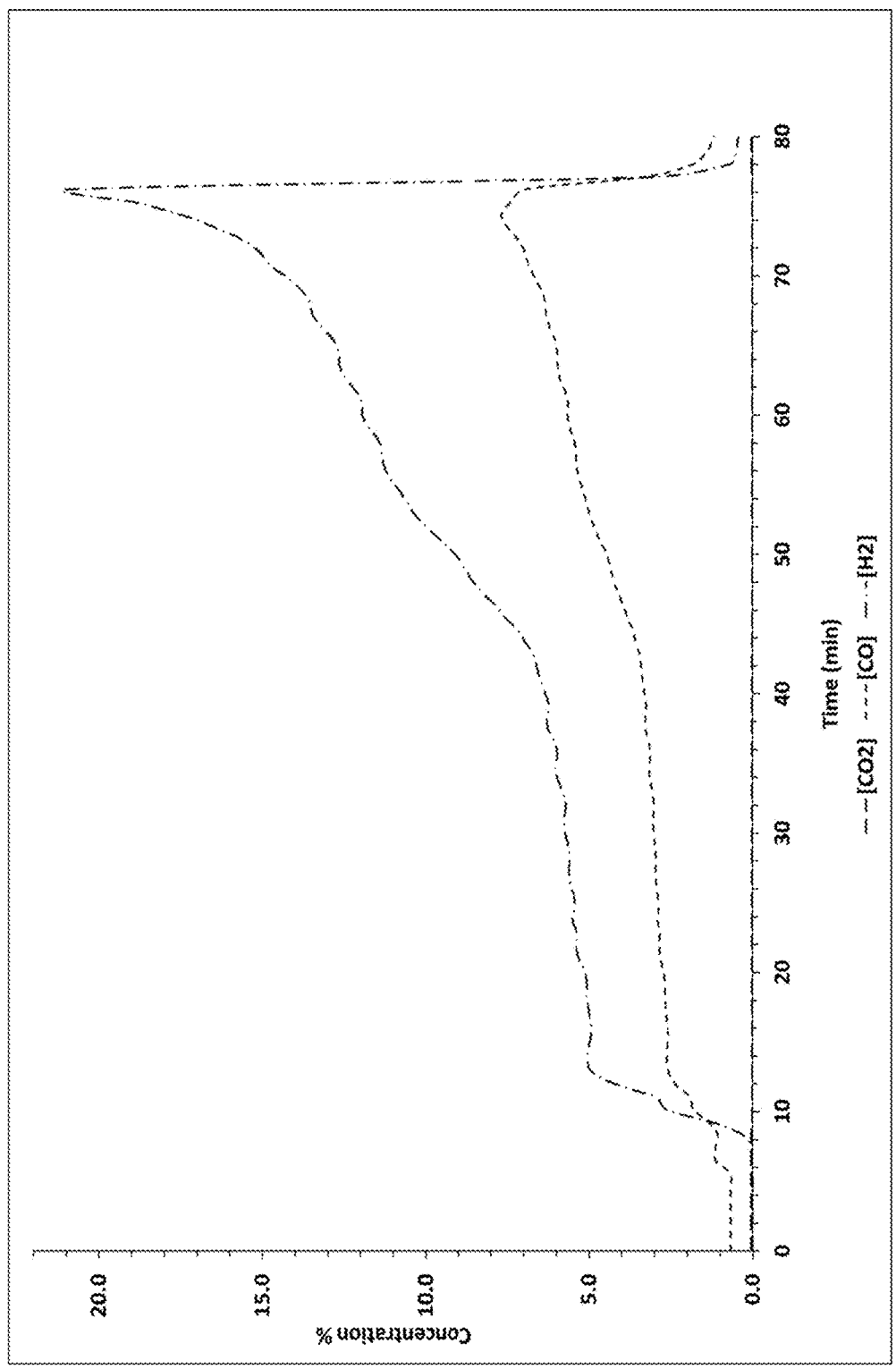
Figure 8C:
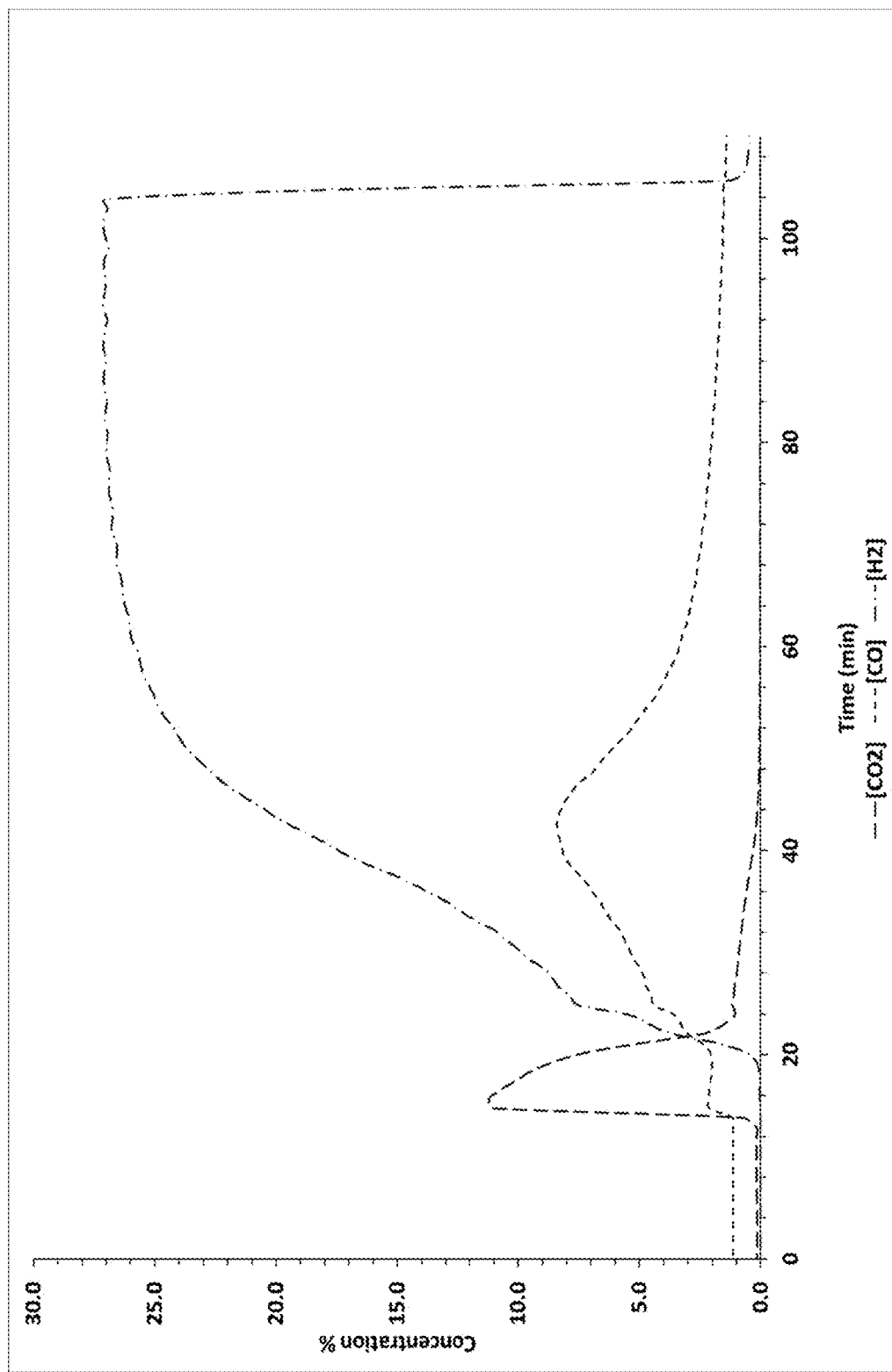
Figure 9A:
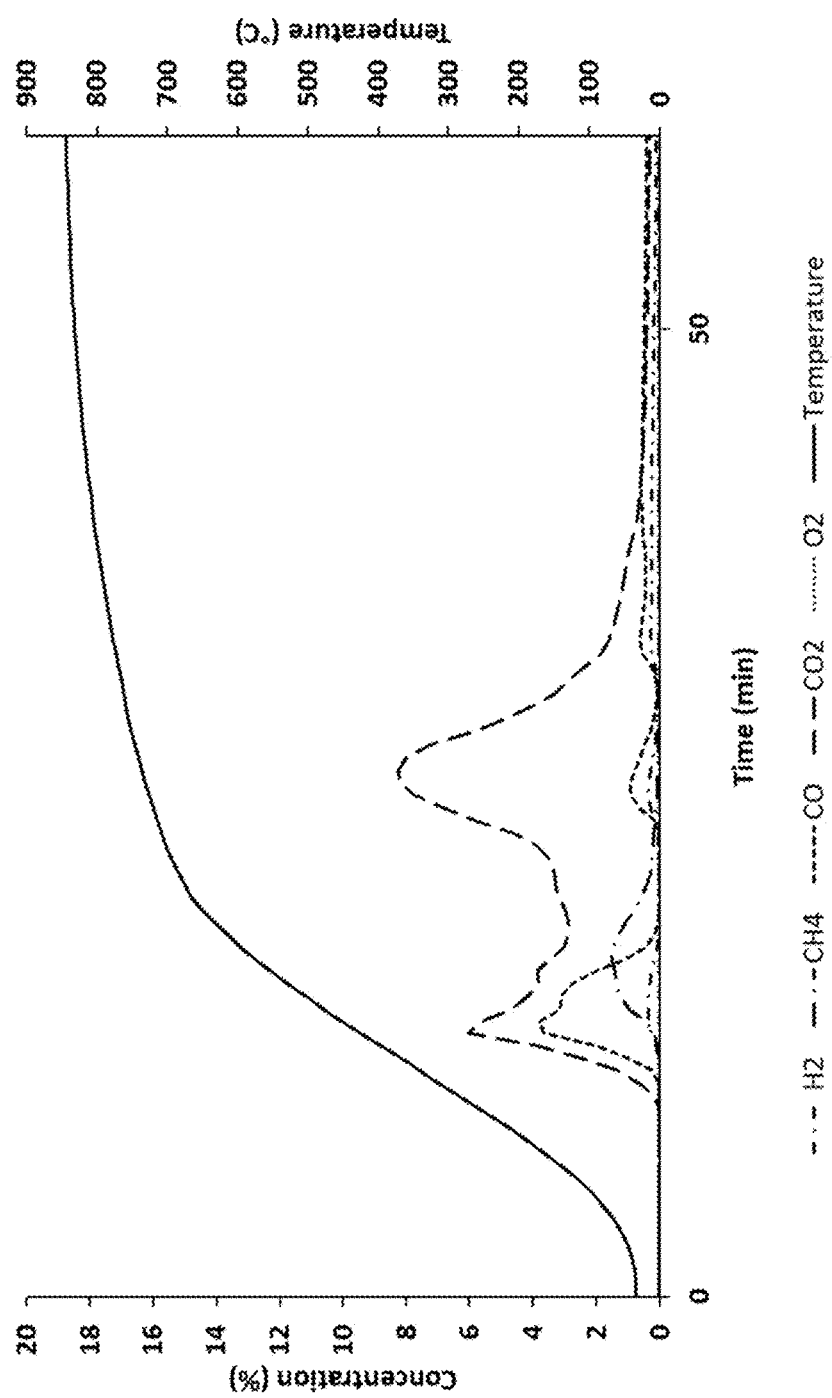
Figure 9B:
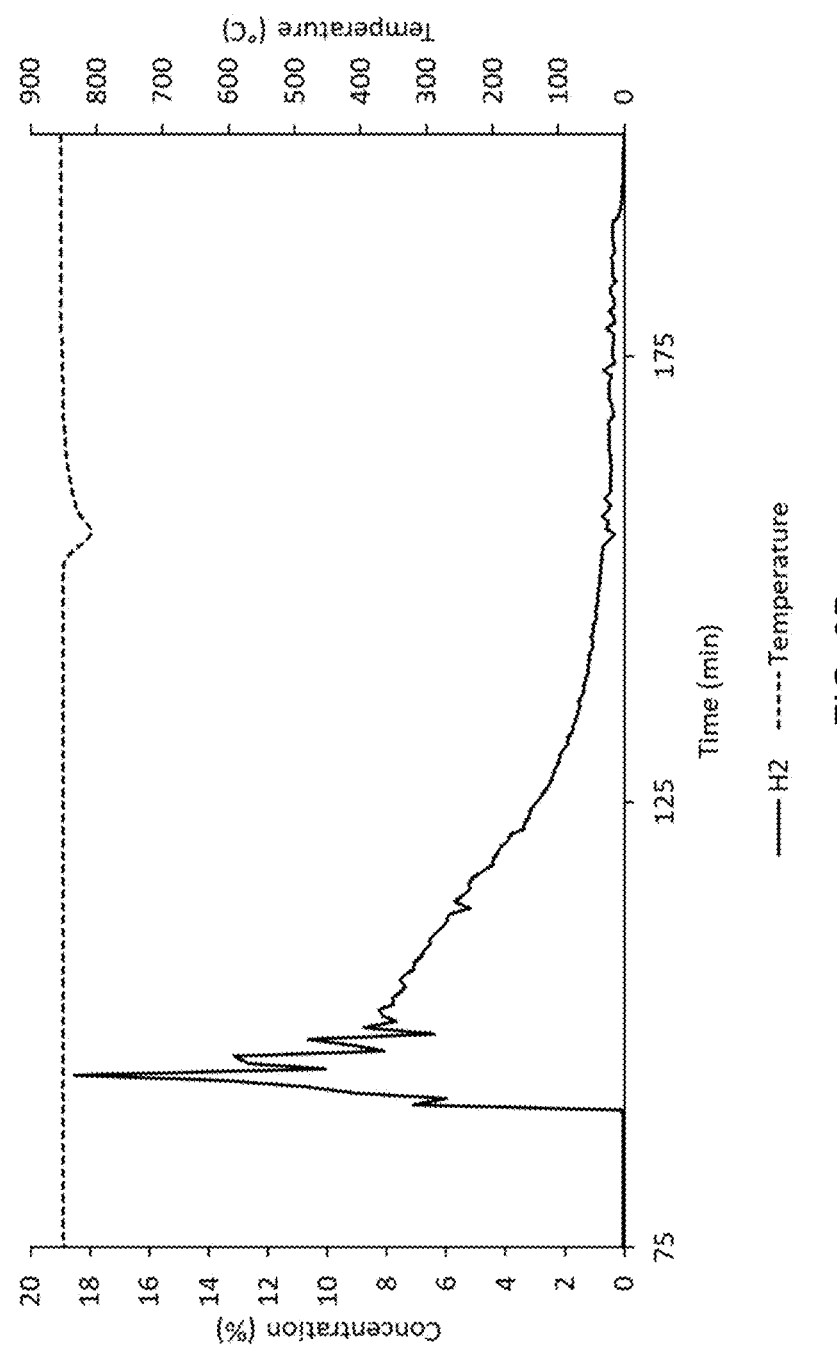
Figure 10A:
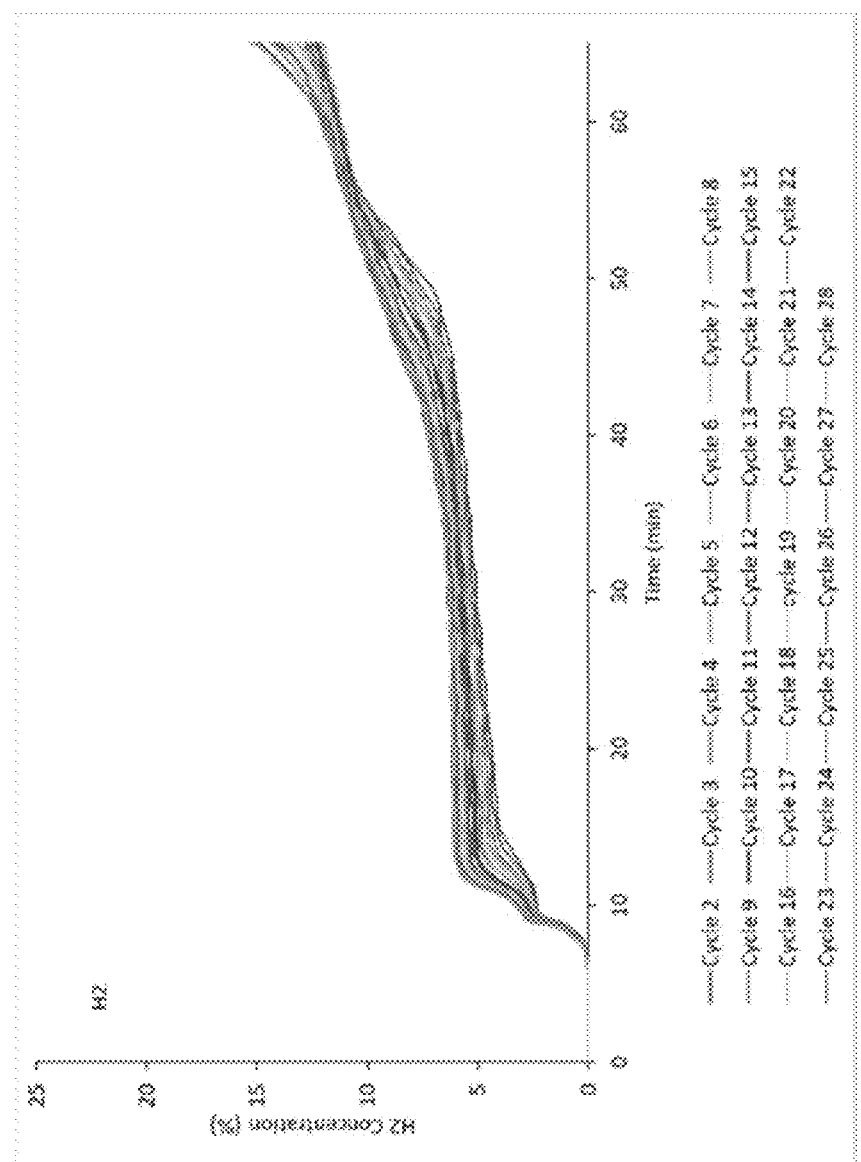
Figure 10B:
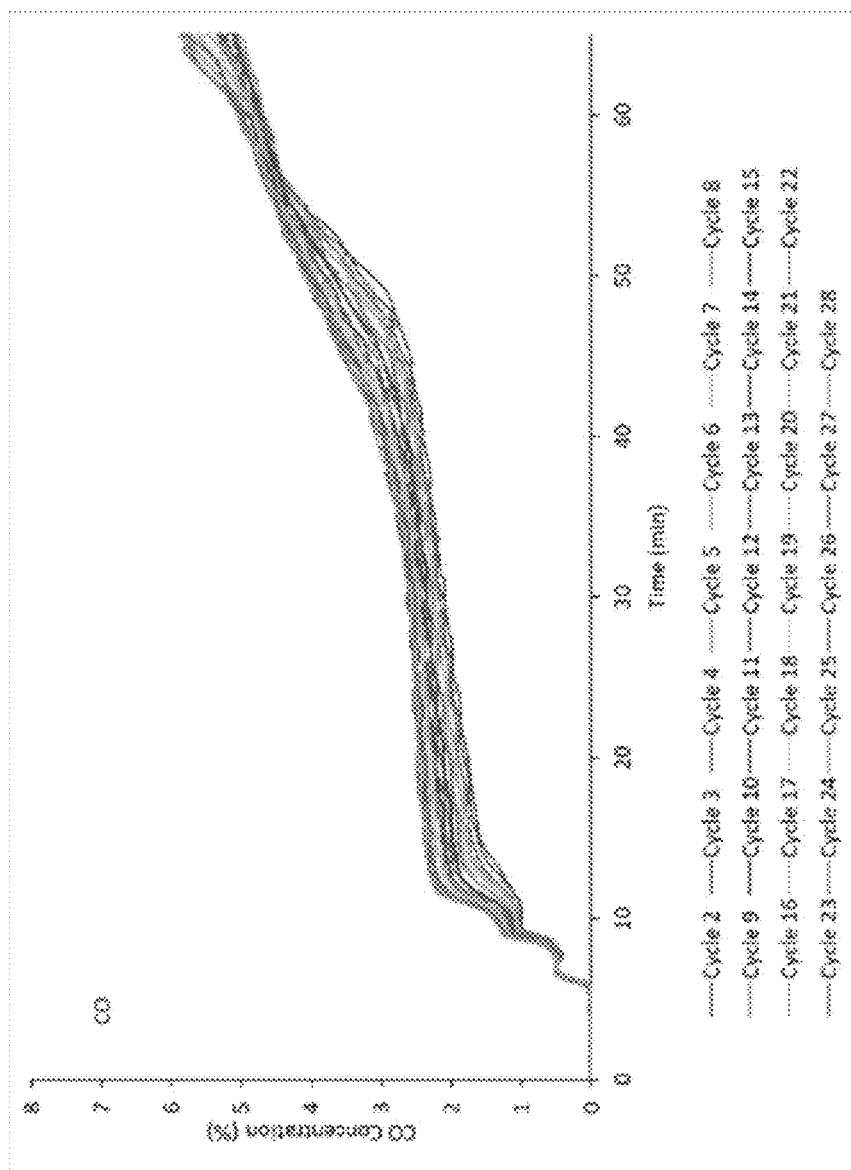
Figure 10C:
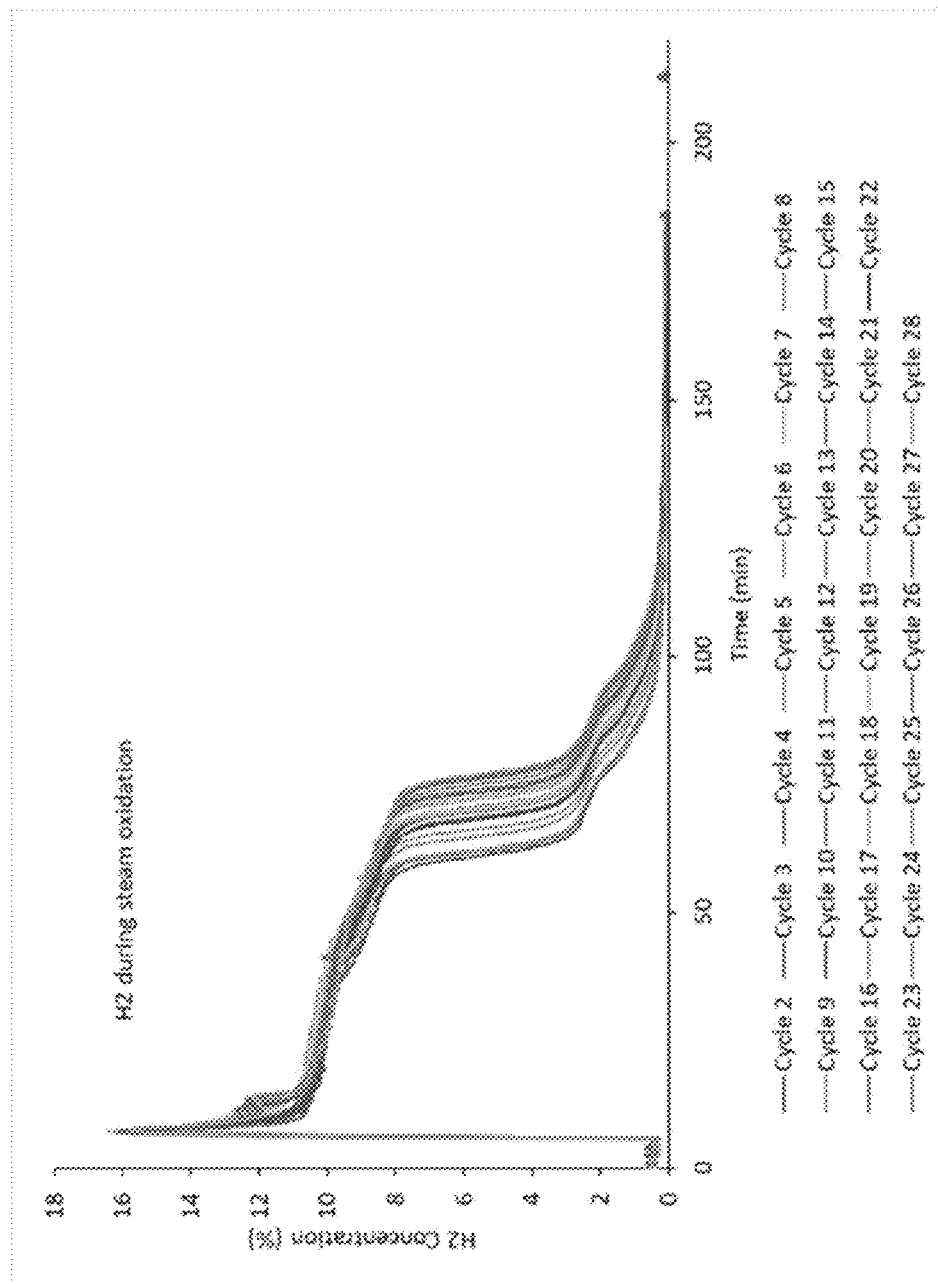

FIGS. 8A-C are graphs of effluent gas concentration from fixed bed flow reactor tests during methane and air introduction to an oxygen carrier, with FIG. 8A using 100% $CaFe_2O_4$ as the oxygen carrier, FIG. 8B using a 67 mass % $CaFe_2O_4$ & 33 mass % $CuFeMnAlO_4$ mixture as the oxygen carrier, and FIG. 8C using 100% $CuFeMnAlO_4$ as the oxygen carrier, in accordance with the features of the present invention;

FIG. 9A is a graph of effluent gas concentrations during reduction of a 11% $CuFeAlO_4$/89% $CaFe_2O_4$ mixture oxygen carrier with wood biomass in He during the temperature ramp to 850° C., in accordance with the features of the present invention;

FIG. 9B is a graph of the concentration of $H_2$ during steam oxidation of the oxygen carrier reduced in FIG. 9A at 850° C., in accordance with the features of the present invention; and FIGS. 10A-0B are graphs of $H_2$ and CO concentrations during reduction of a 33% $CuFeMnAlO_4$/67% $CaFe_2O_4$ mixture carrier with 20% methane in He at 800° C., with FIG. 10A showing $H_2$ concentration and FIG. 10B showing CO concentration, in accordance with the features of the present invention; and FIG. 10C is a graph of concentration of $H_2$ during steam oxidation of the oxygen carrier reduced in FIG. 10A at 800° C., in accordance with the features of the present invention.

DETAILED DESCRIPTION

The following description is provided to enable any person skilled in the art to use the invention and sets forth the best mode contemplated by the inventors for carrying out the invention. Various modifications, however, will remain readily apparent to those skilled in the art, since the principles of the present invention are defined herein specifically to provide description of making hydrogen from fuel using a chemical looping process utilizing a dual oxygen carrier.

Embodiments relate to utilizing domestic natural gas and other fuel sources for hydrogen production in a sustainable process. Embodiments of the invented hydrogen production process are auto thermal, do not require an external heat source, and reduce greenhouse gas emissions compared to state of the art hydrogen production methods.

Generally, the invention comprises a process to generate hydrogen. The process begins with oxidizing a fuel in a fuel reactor in the presence of a combination of oxygen carriers, thereby reducing the oxygen carriers. A portion of the reduced oxygen reacted with air in an air reactor to reproduce the combination of oxygen carriers in their initial oxidation state along with heat. The regenerated, combined oxygen carriers and heat from the air reactor are then provided back into the fuel reactor for further reaction with fuel. A separate portion of the reduced oxygen carriers taken from the fuel reactor is reacted with steam in a steam reactor to produce hydrogen and a partially oxidized combination of oxygen carriers. The partially oxidized combination of oxygen carriers is combined with the combination of reduced oxygen carriers to be oxidized in the air reactor to reproduce the combination of oxygen carriers in their original oxidation state.

Figure 1:
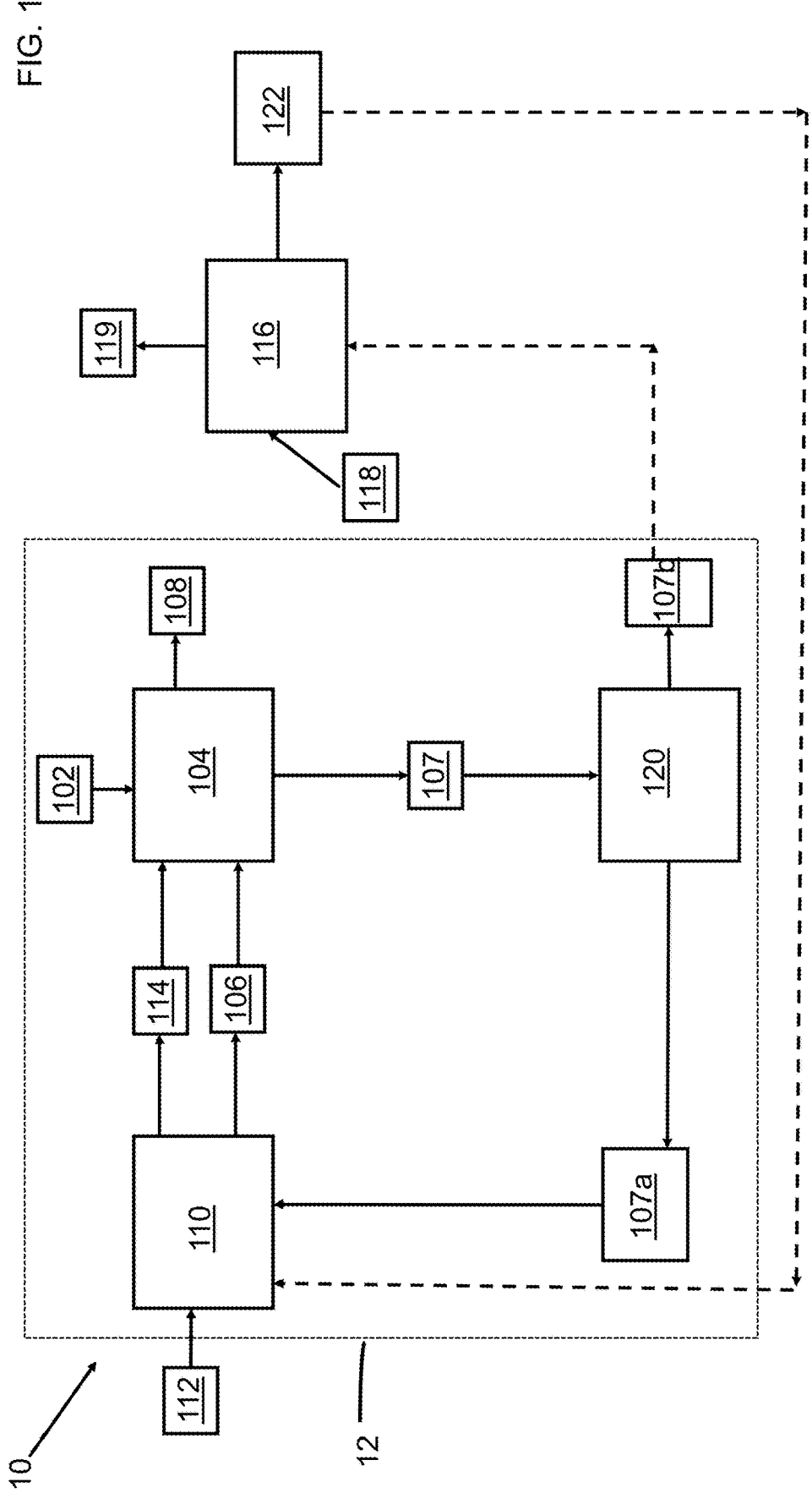
FIG. 1 is a schematic of a system for chemical looping, in accordance with the features of the present invention.

FIG. 1 is a simplified schematic of an exemplary chemical looping system 10 suitable for use with the instant invention. The system 10 comprises a fuel reactor 104 that is upstream of and in fluid communication with a solid stream splitting device 120. The solid stream splitting device 120 is upstream of and in fluid communication with an air reactor 110. The air reactor 110 is upstream of and in fluid communication with the fuel reactor 104. The combination of fuel reactor 104, solid stream splitting device 120, and air reactor 110 comprise a loop 12 wherein moieties circulate from the fuel reactor 104 to the solid stream splitting device 120 to the air reactor 110, and back to the fuel reactor 104, etc., wherein flow direction is shown by the solid arrows in FIG. 1. The system 10 in FIG. 1 utilizes a steam reactor 116 that is decoupled from and not in fluid communication with the loop 12 in the exemplary chemical looping system 10 shown in FIG. 1. Flow to and from the steam reactor 116 is shown in FIG. 1 using dashed arrows.

Figure 2:
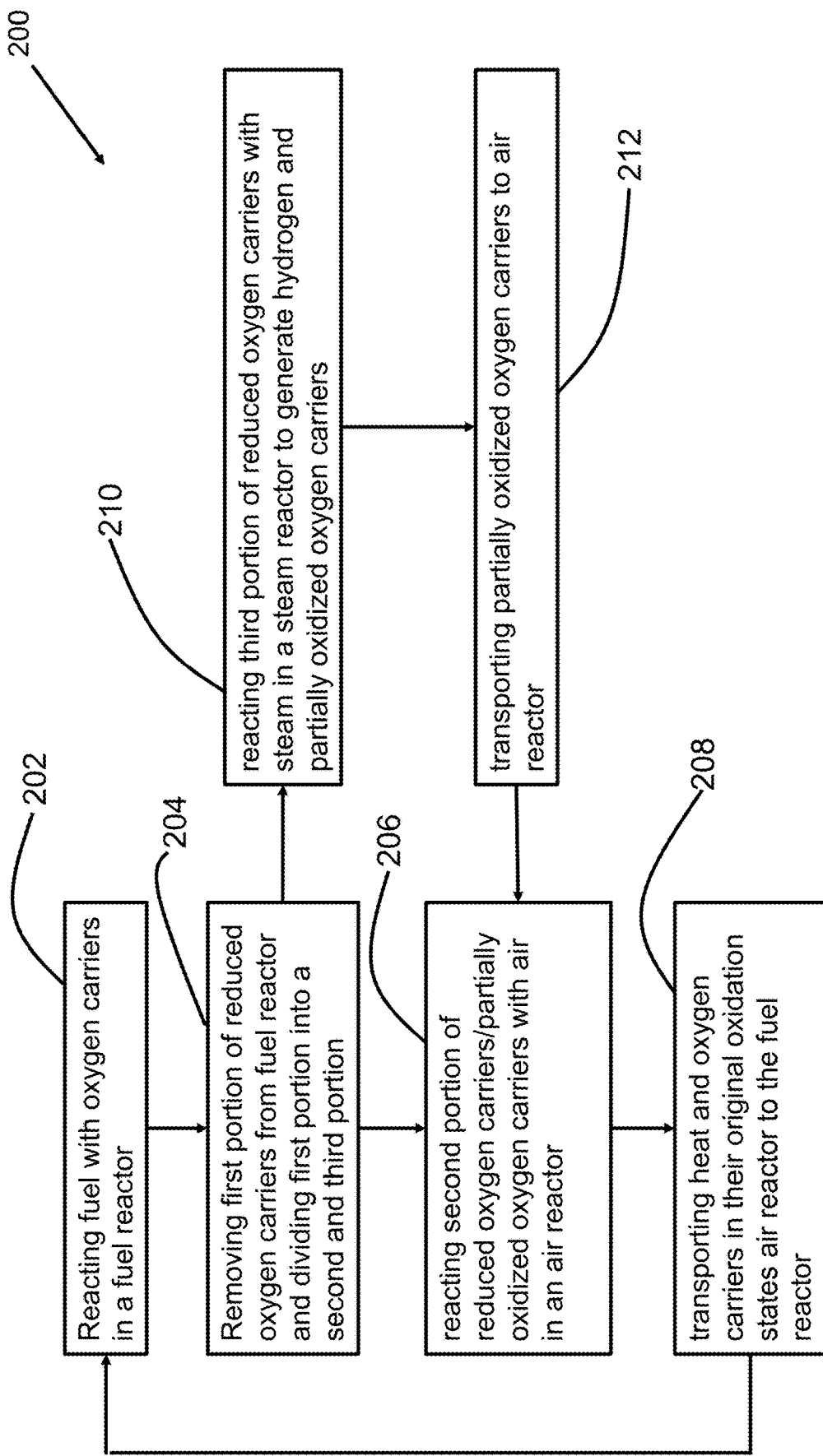
FIG. 2 depicts a flow diagram of a chemical looping process for producing hydrogen using a combination two oxygen carriers, in accordance with the features of the present invention.

FIG. 2 is a flow diagram depicting an embodiment of the invented chemical looping process 200 to generate hydrogen using a chemical looping system such as the exemplary looping system 10 shown in FIG. 1. The process begins by reacting 202 a fuel 102 with a mixture of oxygen carriers 106 in a fuel reactor 104. In the reaction of fuel step 202, the fuel reactor 104 is heated to a reducing temperature for a sufficient amount of time to initiate the reacting 202 of the fuel 102 with the combination of oxygen carriers 106 according to the first and second general reactions (GR1 and GR2), infra.

In an embodiment, the invented process 200 can use any fuel 102 that can reduce the combination oxygen carriers as fuel. Exemplary fuels include methane, natural gas, syngas, hydrogen, flare gas, land fill gas, coal, biomass, municipal waste, plastics, and combinations thereof.

As described herein, the invented process 200 uses a combination of oxygen carriers 106. Said combination of oxygen carriers 106 comprises a physical mixture of a first oxygen carrier ($M^1O$) and a second oxygen carrier ($M^2O$). In the combination of oxygen carriers 106 as provided to the fuel reactor 104 to react with fuel, both oxygen carriers are fully oxidized. In an embodiment, the first oxygen carrier is any oxygen carrier capable of partially oxidizing the fuel 102 as shown in GR1 below. In exemplary embodiments, the first oxygen carrier is a group II metal ferrite, having the general formula $M_zFe_xO_y$. Suitable and exemplary stoichiometries for the first oxygen carrier are provided in Table 1.

TABLE 1

| $M_zFe_xO_y$ Composition and Stoichiometry | | | |
|---|---|---|---|
| $M_zFe_xO_y$ | | Range | |
| Component | Elements | z | x | y |
| | Mg, Ca, Ba, Sr, and combinations thereof | 1-3 | 1-3 | 1-5 |

In an embodiment, the second oxygen carrier is any oxygen carrier suitable for fully combusting the fuel 102 as shown in GR2 below. Exemplary second oxygen carriers have the general formula $A_{3-z}B_{z-x}C_xO_{4+\delta}$, and can have a wide range of compositions makeup and elemental stoichiometry, as shown in Table 2.

TABLE 2

| Component | Elements | z | x |
|---|---|---|---|
| | $A_{3-z}B_{z-x}C_xO_{4+\delta}$ | | |
| | $A_{3-z}B_{z-x}C_xO_{4+\delta}$ | | |
| A | Cu, Fe, Mn, Ni, Co, Cr | 0-3 | 0-3 |
| B | Fe, Mn, Al | | |
| C | Fe, Mn, Al, FeMn, FeA, MnAl | | |
| Other | Range | | |
| δ | ±2 | | |

In the reaction of fuel step 202, the first oxygen carrier ($M^1O$) reacts with the fuel to produce reduced first oxygen carrier ($M^1$) and syngas or CO depending on the fuel used. GR1 shows the highly endothermic reaction between $M^1O$ and methane to produce the major product syngas with a minimal amount of $CO_2$. This syngas stream which is not diluted with $N_2$ can be used for chemical production. Concurrently, the second oxygen carrier reacts exothermically with the fuel to produce reduced second oxygen carrier ($M^2$), $CO_2$, and $H_2O$ as shown in GR2.

$$CH_4 + M_1O \rightarrow CO + 2H_2 + M_1 \quad \text{GR1}$$

$$CH_4 + 4M^2O \rightarrow CO_2 + 2H_2O + 4M^2 \quad \text{GR2}$$

During the reaction of fuel step 202, the combination of reduced first and second oxygen carriers 107 can further catalyze pyrolysis of the hydrogen carbon fuel shown in GR3.

$$CH_4 \rightarrow C + 2H_2 \quad \text{GR3}$$

Also during the reaction of fuel step 202, $H_2O$ and $CO_2$ formed from GR2 can further react with the products from GR1 and GR3 to enhance the syngas yields as shown in reactions GR4-GR7.

$$M^1 + nH_2O \rightarrow nH_2 + M^1O_n, \; n<1 \quad \text{GR4}$$

$$M^1 + nCO_2 \rightarrow nCO + M^1O_n, \; n<1 \quad \text{GR5}$$

$$C + H_2O \rightarrow CO + H_2 \quad \text{GR6}$$

$$C + CO_2 \rightarrow 2CO \quad \text{GR7}$$

As described throughout the instant application, the invented process 200 uses a combination of two oxygen carriers 106. In an embodiment, the two oxygen carriers can be combined and used in any ratio. Exemplary embodiments use a ratio of the first oxygen carrier to second oxygen carrier between approximately 1:0 to approximately 1:1. Preferably, the ratio of first oxygen carrier to second oxygen carrier is between approximately 1:0.2 to approximately 1:1.

In an embodiment, the combination of oxygen carriers 106 is a physical mixture of the two, neat, oxygen carriers. In alternative embodiments, the mixture of oxygen carriers 106 includes a binder or support, the binder or support comprising alumina, silica, zirconia, titania, and combinations thereof.

To facilitate reactions GR1-GR7, the fuel reactor 104 is maintained at a reducing temperature. The reducing temperature is any temperature sufficient to reduce at least a portion of the mixed oxygen carriers 106 or produce reactions GR1-GR7. In an embodiment, the reducing temperature is between approximately 400° C. to approximately 1100° C. and can be tuned depending on the fuel 102. When the fuel is $H_2$ or syngas, the reducing temperature can be tuned to between approximately 400° C. to approximately 600° C. When the process 200 uses fuels such as methane, coal, or biomass, the reducing temperature may be tuned to between approximately 700° C. to approximately 950° C. Overall, the reactions that occur in the fuel reactor 104 during the reaction of fuel step 202 are net endothermic and require heat input.

Syngas products 108 of the reaction of fuel step 202 are gaseous products withdrawn from the fuel reactor 104 as a product stream at an exhaust exit from said fuel reactor. At the exhaust exit, in an embodiment, at least 50 vol. % of the syngas products 108 comprises CO and $H_2$. In another embodiment, at least 90 vol. % of the syngas products 108 comprises CO and $H_2$. In an embodiment, the ratio of first oxygen carrier to second oxygen carrier in the combination of oxygen carriers 106 can be tuned to adjust the volume of the syngas products 108 that comprises CO and $H_2$, wherein CO and $H_2$ volume increases with increasing first oxygen carrier content and $CO_2$ increases with increasing second oxygen carrier content.

Returning to FIG. 2, after the reaction 202 of the combined oxygen carriers 106 with the fuel 102, the process 200 continues by removing 204 a first portion of reduced oxygen carriers 107 from the fuel reactor 104 and dividing said first portion of reduced oxygen carriers 107 into second 107a and third 107b portions of reduced oxygen carriers using the solid stream splitting device 120 positioned between the fuel reactor 104 and air reactor 110. The solid stream splitting device 120 comprises any device suitable for receiving a stream of solid particles and dividing said stream into portions. An exemplary solid stream splitting device is a downcomer tube with a Y split and simple gate valve that can be used to control solids flow in two directions.

As described above, in the removing and dividing step 204, the first portion of reduced oxygen carriers 107 is divided into a second 107a and third portion 107b. The second portion of reduced oxygen carriers 107a comprises the mass % of the first portion of oxygen carriers transferred directly from the fuel reactor 104, through the solid stream splitting device 120 to the air reactor 110. The third portion of reduced oxygen carriers 107b comprises the mass % of the first portion of the oxygen carriers 107 that the solid stream splitting device 120 diverts toward the steam reactor 116 as shown in FIG. 1.

The relative amounts of reduced mass carrier routed to the air reactor in the second portion of reduced oxygen carrier 107a or to the steam reactor in the third portion of reduced oxygen carrier 107b can be tuned as desired. In an embodiment, the ratio of second and third portions of oxygen carriers is tuned to maintain auto thermality of the loop 12 shown in FIG. 1. Similarly, the ratio of second and third portions of oxygen carriers can be tuned when using different fuels or to produce more hydrogen using the method 200.

Returning to FIG. 2, the process 200 continues by reacting 206 the second portion of reduced oxygen carriers 107a with air ($O_2$) 112 in the air reactor 110 to produce heat 114 and regenerate the combination of oxidation carriers 106 in their original oxidation states. Reactions GR8-GR9 show the oxidation reactions that occur in the air reactor 110 between air and the reduced oxygen carriers 107.

To facilitate reactions GR8-GR9, the air reactor 110 is maintained at an oxidizing temperature sufficient to complete reactions GR8-GR9. The oxidizing temperature is any temperature sufficient to oxidize at least a portion of the reduced combination of oxygen carriers 107 partially or fully while producing heat 114. In an embodiment, the oxidizing temperature is between approximately 600° C. to approximately 1100° C., wherein the oxidizing temperature can be tuned depending on the fuel used in the process 200.

When the process 200 uses fuels such as methane, coal, or biomass, the oxidizing temperature may be tuned to between approximately 750° C. to approximately 950° C. When the fuel 102 is $H_2$ or syngas, the oxidizing temperature can be tuned to between approximately 600° C. to approximately 700° C. In an embodiment, the oxidizing temperature in the air reactor 110 can be tuned in order to produce more or less heat 114 to transfer to the fuel reactor in the transferring step 208 described, infra. In another embodiment, the oxidizing temperature is 100° C. greater than the reducing temperature.

$$M^1 + 0.5O_2 \rightarrow M^1O \quad \text{GR8}$$

$$M^2 + 0.5O_2 \rightarrow M^2O \quad \text{GR9}$$

Reactions GR8 and GR9 taking place in the air reactor 110 are highly exothermic and, in an embodiment, generate sufficient heat 114 to supply the heat to the fuel reactor 104 needed to generate the net endothermic reactions occurring therein. As such, the process 200 continues by transferring 208 heat 114 and fully oxidized ($M^1O$ and $M^2O$) combined oxygen carriers 106 from the air reactor 110 to the fuel reactor 104 to be reused in reacting with the fuel. In an embodiment, the process 200 repeats a desired number of times, using more fuel each time the process repeats. In another embodiment, the process 200 operates continuously, using more each time the process repeats.

In an embodiment, the heat 114 transferred 208 from the air reactor 110 to the fuel reactor 104 is sufficient to maintain the fuel reactor 104 at the reducing temperature, making the process 200 depicted in FIG. 2 autothermal. Surprisingly and unexpectedly, the use of combined oxygen carriers 106 makes the combined reactions occurring in the fuel reactor 104 and air reactor 110 less endothermic than in alternative approaches.

Returning to FIG. 2, the invented process 200 further comprises transferring the third portion of the reduced oxygen carriers 107 from to the steam reactor 116 and reacting 210 the reduced oxygen carriers 107 with steam 118 to partially oxidize the reduced oxygen carriers 107 as shown in GR4, supra, and generate hydrogen gas 119.

In an embodiment, the steam reactor 116 is decoupled from the loop including the fuel reactor 104 and air reactor 110. Using a steam reactor 116 that is decoupled from the other reactors used in the invented process 200 allows for safe transport of reduced oxygen carrier 107 while avoiding transport of high-pressure hydrogen cylinders or liquified hydrogen cylinders. Instead, reduced oxygen carrier 107 can be safely transported to the desired location where $H_2$ is needed with no need for advanced containment or concerns about material stability. $H_2$ production at a location away from the fuel source is possible due to the exothermicity of the reaction. $H_2$ can be produced at a desired location eliminating expensive transport of unsafe pressurized $H_2$ tanks and potential losses due to boiloff seen in Liquid and cryo-compressed storage and transport.

Returning to FIG. 2, after reacting 210 the steam 118 and the reduced oxygen carriers 107, partially oxidized oxygen carriers 122 are transferred 212 from the steam reactor 116 to the air reactor 110 and combined with the second portion of reduced oxygen carriers 107a to be included in the reaction 206 with air to fully oxidize the combined oxygen carriers 106 as shown in reactions GR9-GR10. At the conclusion of the reaction with air 112, the formerly reduced oxygen carriers 107 and partially oxidized oxygen carriers 122 are fully oxidized to their original oxidation states and suitable for transfer back to the fuel reactor 104.

$$M^1O_n + (n/2)O_2 \rightarrow M^1O, n>1 \quad \text{GR10}$$

Surprisingly and unexpectedly, using the combination of two oxygen carriers 106 in the invented process 200 generates sufficient excess heat to operate the fuel reactor 104. State of the art processes, on the other hand, require their steam reactors to be coupled with their air and fuel reactor loop in order to provide heat to their fuel reactor.

In alternative embodiments, heat can be taken from the syngas products 108 of the reacting with fuel 202 step and transferred either to the fuel reactor 104 or air reactor 110 to facilitate the reactions occurring therein.

In yet another embodiment, auxiliary heaters can be used to facilitate the reactions in either the fuel reactor 104 or air reactor 110.

EXAMPLE

An exemplary, detailed reaction scheme is outlined in Table 3 using exemplary compositions for the two oxygen carriers in conjunction with the system and method described above. A group 2 (two) ferrite, $CaFe_2O_4$, is used as an exemplary $M^1O$ (first oxygen carrier). A transition metal ferrous-aluminate, $CuFeAlO_4$, is used to as an exemplary $M^2O$ (second oxygen carrier). In this reaction scheme, the exothermicity generated from oxidation of the $M^2O$ carrier is used to offset predominantly endothermic fuel reactor reactions.

TABLE 3

Detailed Reaction Scheme

| Reactor | | R# | ΔH (kJ/mol @ 800° C.) |
|---|---|---|---|
| | Reactions—$M_zFe_xO_y$, where M = Ca, z = 1, x = 2, y = 4 ($CaFe_2O_4$) | | |
| 104 Fuel Reactor | $CaFe_2O_4 + 0.125CH_4 \rightarrow 0.5Ca_2Fe_2O_5 +$ $FeO + 0.125CO_2 + 0.24H_2O$ | R1 | 75 |
| | $0.5Ca_2Fe_2O_5 + 1.5CH_4 \rightarrow CaO + Fe +$ $1.5CO + 3H_2$ | R2 | 394 |
| | $CH_4 \rightarrow C + 2H_2$ | R3 | 93 |
| | $FeO + C \rightarrow Fe + CO$ | R4 | 152 |
| | $C + H_2O \rightarrow CO + H_2$ | R5 | 135 |
| | $C + CO2 \rightarrow 2CO$ | R6 | 169 |
| | $CaO + Fe + H_2O \rightarrow 0.5Ca_2Fe_2O_5 +$ $1.5H_2$ | R7 | −108 |
| 116 Steam Oxidation Reactor | $Fe + H_2O \rightarrow FeO + H_2$ | R8 | −16 |
| | $FeO + 0.33H_2O \rightarrow 0.33Fe_3O_4 + 0.33H_2$ | R9 | −17 |
| 110 Air Reactor | $CaO + Fe + 0.75O_2 \rightarrow 0.5Ca_2Fe_2O_5$ | R10 | −427 |
| | $Fe + 0.5O_2 \rightarrow FeO$ | R11 | −265 |
| | $0.5Ca_2Fe_2O_5 \; FeO + 0.25O_2 \rightarrow CaFe_2O_4$ | R12 | −149 |
| | $0.5Ca_2Fe_2O_5 + 0.33Fe_3O_4 +$ $0.083O_2 \rightarrow CaFe_2O_4$ | R13 | −49 |
| | Reactions—$A_{3-z}B_{z-x}C_xO_{4+\delta}$, where A = Cu, B = Fe, C = Al, z = 2, and x = 1 | | |
| 104 Fuel Reactor | $CuFeAlO_4 + 0.5Al_2O_3 + 0.375CH_4 \rightarrow$ $Cu + FeAl_2O_4 + 0.375CO_2 + 0.75H_2O$ | R14 | −64 |
| | $FeAl_2O_4 + CH_4Fe \rightarrow Al_2O_3 + CO + 2H_2$ | R15 | 268 |
| 116 Steam Oxidation Reactor | $Fe + Al_2O_3 + H_2O \rightarrow FeAl_2O_4 + H_2$ | R16 | −42 |
| 110 Air Reactor | $Fe + A_2O_3 + 0.5O_2 \rightarrow FeAl_2O_4$ | R17 | −290 |
| | $Cu + FeAl_2O_4 + 0.75O_2 \rightarrow CuFeAlO_4 +$ $0.5A_{l2}O_3$ | R18 | −246 |

Using the detailed reaction scheme shown in Table 3, material and thermal energy balances were calculated using various fuel sources such as methane, coal/biomass, and $H_2$. These calculations assume that heat from the product gas stream 108 from the fuel reactor 104 is extracted and used in the fuel reactor 104 when autothermality cannot not be obtained e.g. when $CaFe_2O_4/CuAlO_4$ ratio is below 0.45 in FIG. 3. For these calculations, the second portion of reduced oxygen carriers 107a was fixed at 15% of the first portion of reduced oxygen carriers 107 with the third portion of reduced oxygen carriers 107b fixed at 85% of the first portion unless otherwise denoted. The fuel and total carrier rates were fixed in the analyses. In scenarios where the fuel was changed the fuel reactor 104 reaction scheme would change accordingly to reflect the fuel source.

With these process variables held constant, the ratio of first and second oxygen carriers was varied over the range of 0-1. With $CaFe_2O_4/CuFeAlO_4=1:1$ constituting 100% $CaFe_2O_4$ and $CaFe_2O_4/CuFeAlO_4=0$ constituting 100% $CuFeAlO_4$.

Figure 3:
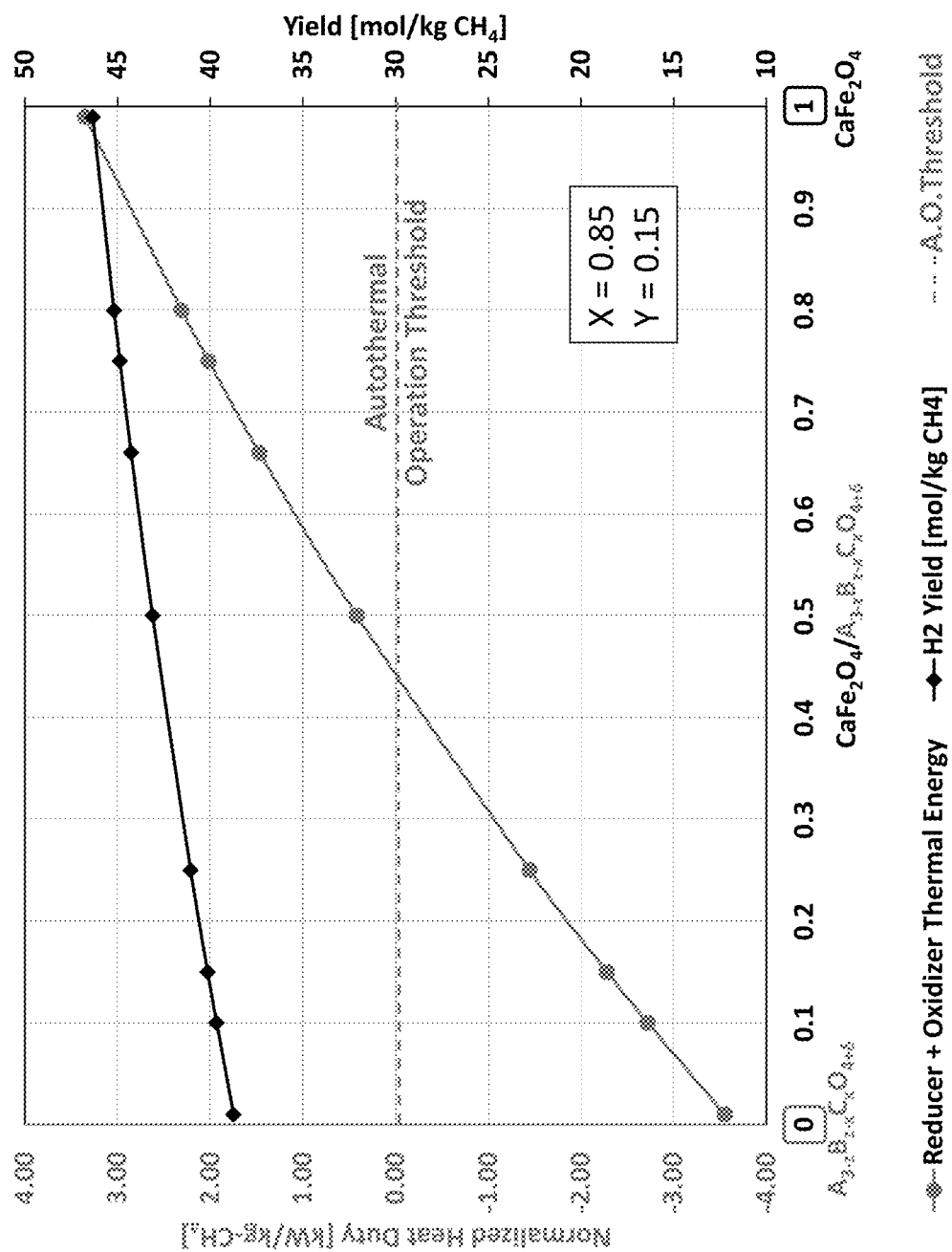
FIG. 3 is a graph of material and thermal energy balances for the invented dual oxygen carrier for methane conversion to syngas and uncoupled steam oxidation for $H_2$ production, in accordance with the features of the present invention.

FIG. 3 provides a graph of calculated material and thermal energy balances under the above-referenced conditions using methane as the fuel and demonstrates the advantages of the dual oxygen carrier process described herein. As shown in FIG. 3 the addition of the second oxygen carrier to the first oxygen carrier offsets the fuel normalized process heat duty (cumulative heat duty of fuel reactor and air reactor). Incorporation of ~55% $CuFeAlO_4$ with ~65% $CaFe_2O_4$ allows for the autothermal threshold to be crossed and a negative heat duty obtained. This enables the process to operate free of external heat requirements. $H_2$ yield from the steam reactor at the uncoupled location is 41 mol $H_2$/kg $CH_4$ with exothermicity on the order of −0.048 kW/kg-carrier over the dual carrier ratio range shown in FIG. 3.

Figure 4:
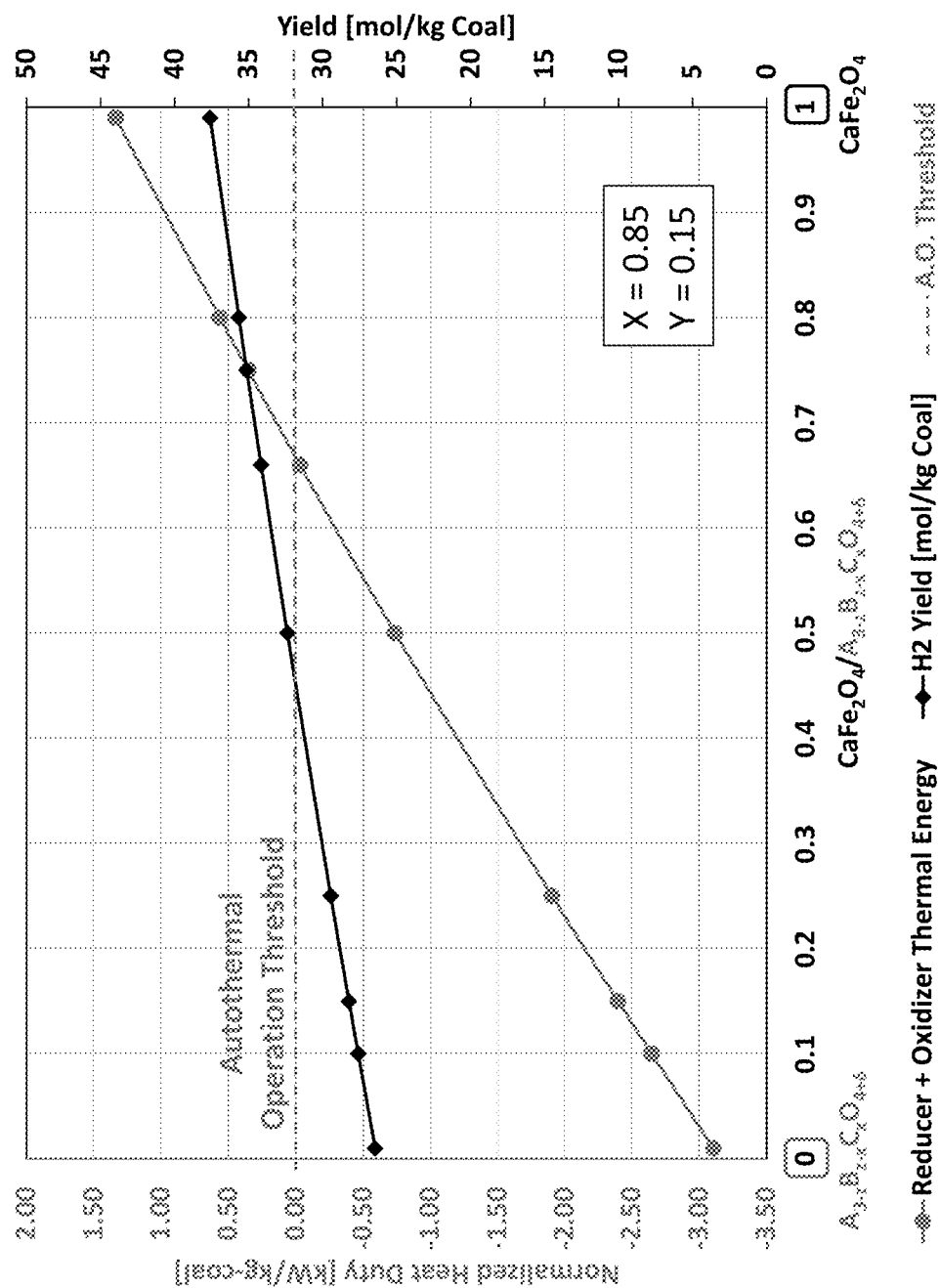
FIG. 4 is a graph of material and thermal energy balances for the invented dual oxygen carrier for coal/biomass conversion to syngas and uncoupled steam oxidation for $H_2$ production, in accordance with the features of the present invention.

FIG. 4 provides a graph of calculated material and thermal energy balances under the above-referenced conditions using coal or biomass as the fuel and demonstrates the advantages of the dual oxygen carrier process described herein. As shown in FIG. 4, incorporation of ~33% $CuFeAlO_4$ with ~67% $CaFe_2O_4$ allows for the autothermal threshold to be crossed and a negative heat duty to be obtained. This enables the process to operate free of external heat requirements. $H_2$ yield at the uncoupled location is 30 mol $H_2$/kg coal with exothermicity remaining on the order of −0.05 kW/kg dual oxygen carriers over the dual carrier ratio range. This heat duty greatly increases the potential for autothermal operation at the uncoupled location. The reaction in the fuel reactor with coal or biomass as fuel is shown in reaction GR11 and GR12 which are different from that with methane.

$$C+M^1O \rightarrow CO\ M^1 \qquad GR11$$

$$C+M^2O \rightarrow CO_2+M^2 \qquad GR12$$

Figure 5:
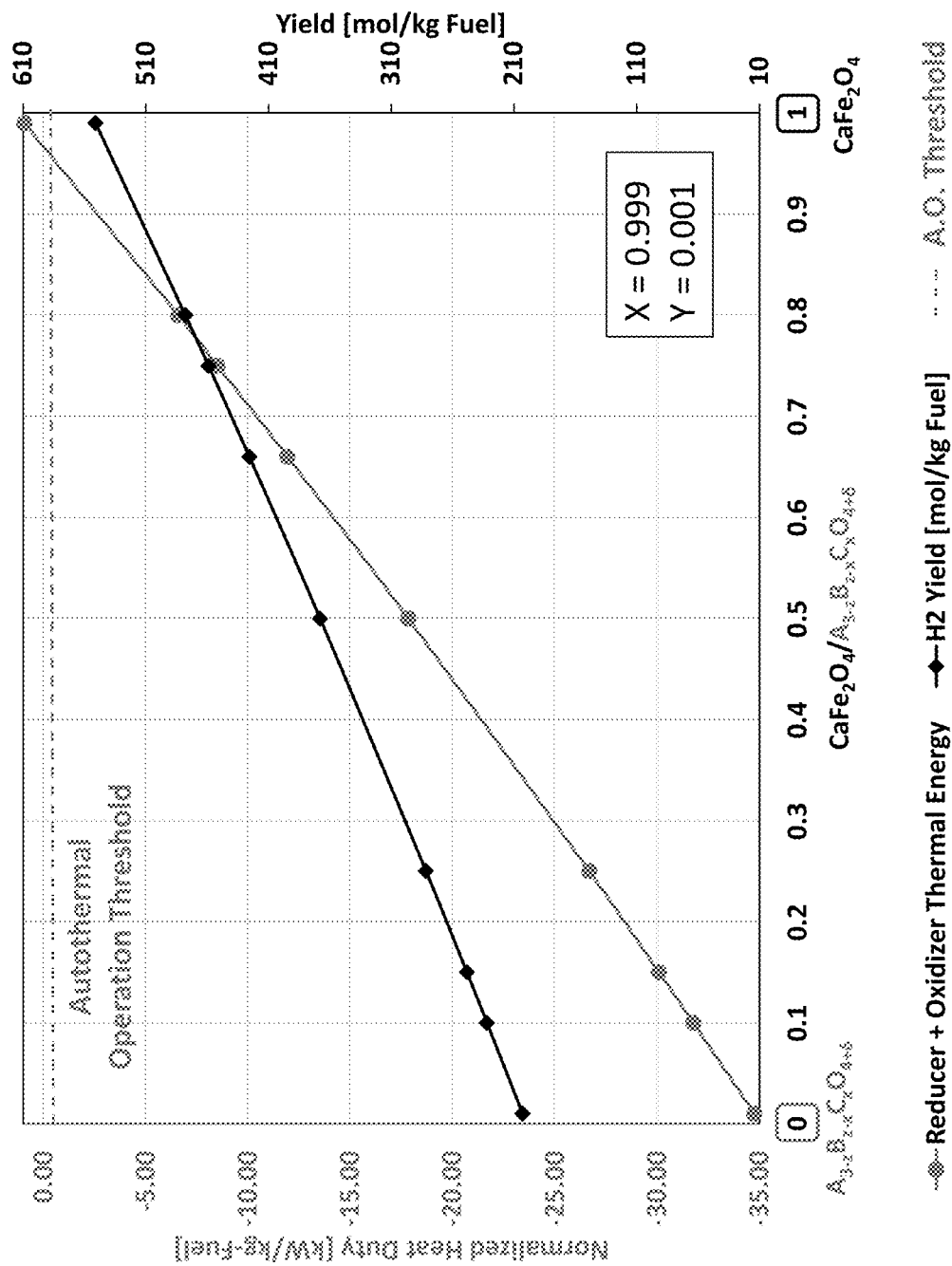
FIG. 5 is a graph depicting material and thermal energy balances for the invented dual oxygen carrier for low temperature $H_2$/syngas reduction and uncoupled steam oxidation for $H_2$ production, in accordance with the features of the present invention.

FIG. 5 provides a graph of material and thermal energy balances for the invented dual oxygen carrier process where the third portion of reduced oxygen carriers is =99.9%, sending nearly all of the reduced oxygen carrier to the steam reactor 116. Under these conditions, incorporation of under ~5% $CuFeAlO_4$ into the dual oxygen carrier still allows for the autothermal threshold to be crossed and a negative heat duty obtained for the invented process. This enables the process to operate free of external heat requirements. $H_2$ yield is 210 mol $H_2$/kg fuel with exothermicity remaining on the order of −0.05 kW/kg Hybrid Carrier over the hybrid ratio range. Exothermicity of the process increases significantly as $CaFe_2O_4$ approaches zero potentially providing an opportunity for enhanced heat recuperation at the reduction facility.

Example II

CaO (99%, Aldrich) and $Fe_2O_3$ (99.99%) were used for the preparation of the partial oxidation carrier ($M^1O$, first oxygen carrier), $CaFe_2O_4$. The powders were mixed, and a sufficient amount of water was added in a rotating mixer for pelletization during mixing. The mixture was heated in an oven to 1000° C.-1100° C. at a ramp rate of 3° C./min in air and kept at 1000° C.-1100° C. for 6 h. Combustion oxygen carriers ($M^2O$, second oxygen carrier) $CuFeMnAlO_4$ and $CuFeAlO_4$ were prepared by a similar procedure using stoichiometric ratios of the oxides.

In the following examples, thermogravimetric Analysis (TGA) analysis was conducted in a TA instruments TA 0500 model unit. Effluent gas analysis was conducted using Pfeiffer Vacuum Omnistar mass spectrometer.

The TGA weight change and corresponding effluent gas concentrations were measured for methane reactions with the invented dual oxygen carrier system by placing 60 mg of oxygen carrier in the TGA pan, heating to 800° C., and introducing 20 vol % methane in Ar. After an inert purge and heating to 700° C., air was then introduced to the TGA pan for oxidation of the oxygen carriers. This procedure was performed with the dual oxygen carrier comprising 100% $CaFe_2O_4$, a 67% $CaFe_2O_4$ 33 $CuFeMnAlO_4$ mixture, and 100% $CuFeMnAlO_4$. This data is shown in FIGS. 6A-C.

Figure 6A:
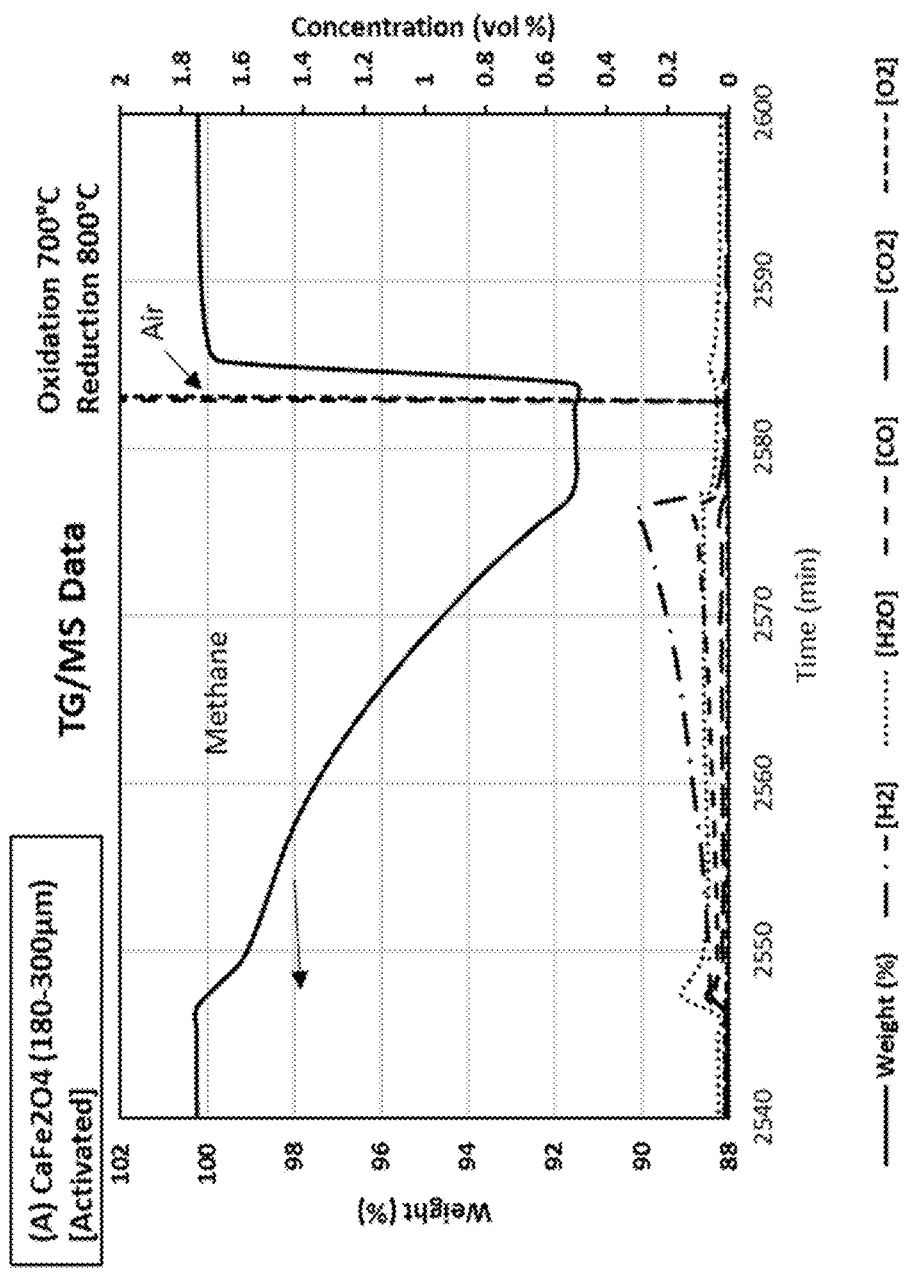
FIGS. 6A-C are graphs of TGA weight data and effluent gas concentration during methane and air introduction to an oxygen carrier, with FIG. 6A using 100% $CaFe_2O_4$ as the oxygen carrier, FIG. 6B using a 67 mass % $CaFe_2O_4$ & 33 mass % $CuFeMnAlO_4$ mixture as the oxygen carrier, and FIG. 6C using 100% $CuFeMnAlO_4$ as the oxygen carrier, in accordance with the features of the present invention.

As shown in FIG. 6A, the reaction of methane with 100% $CaFe_2O_4$ mainly produced CO ad $H_2$ when methane was introduced but the production rates were low as indicated by the effluent gas concentration data.

Figure 6B:
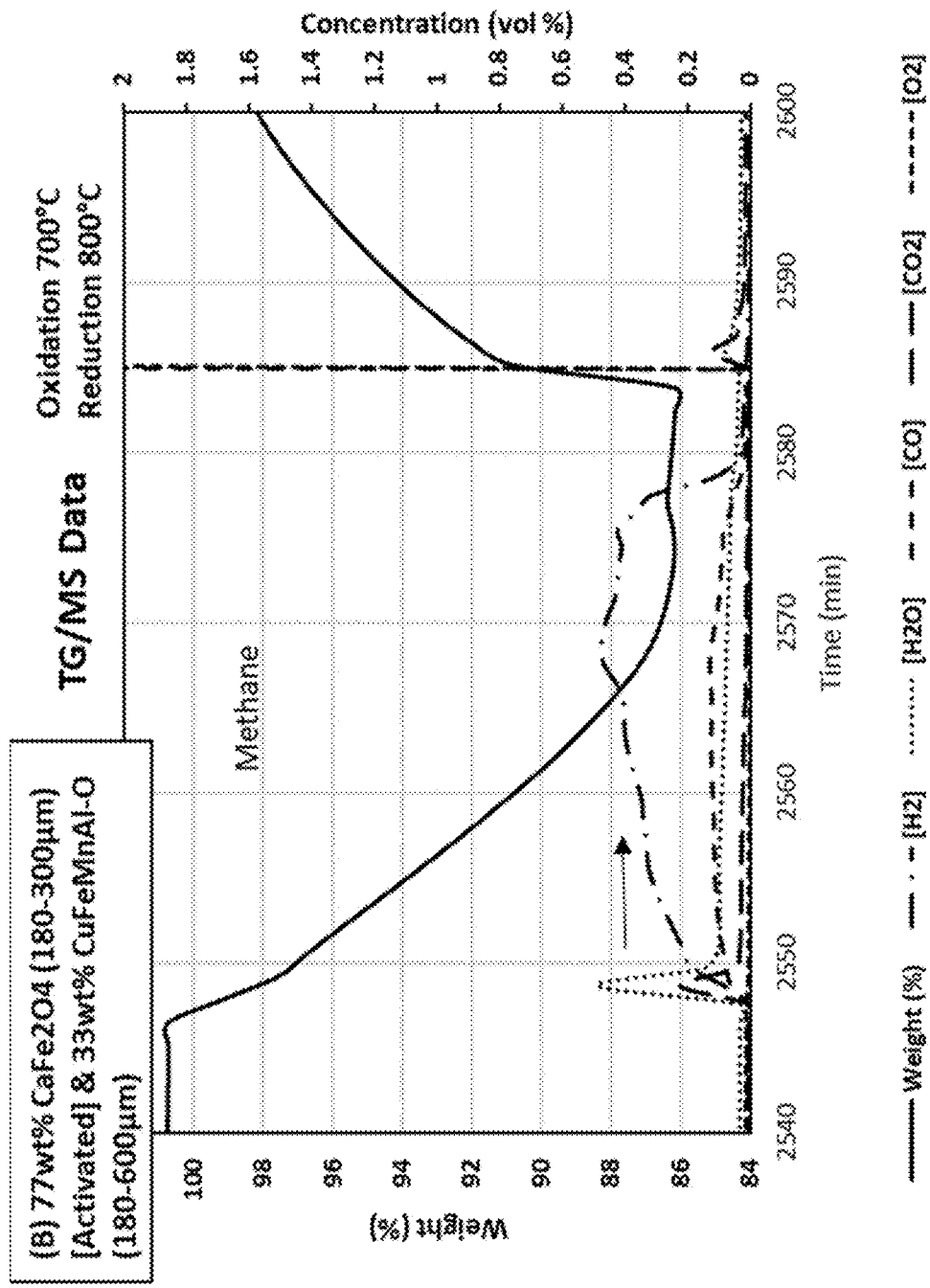
Figure 6C:
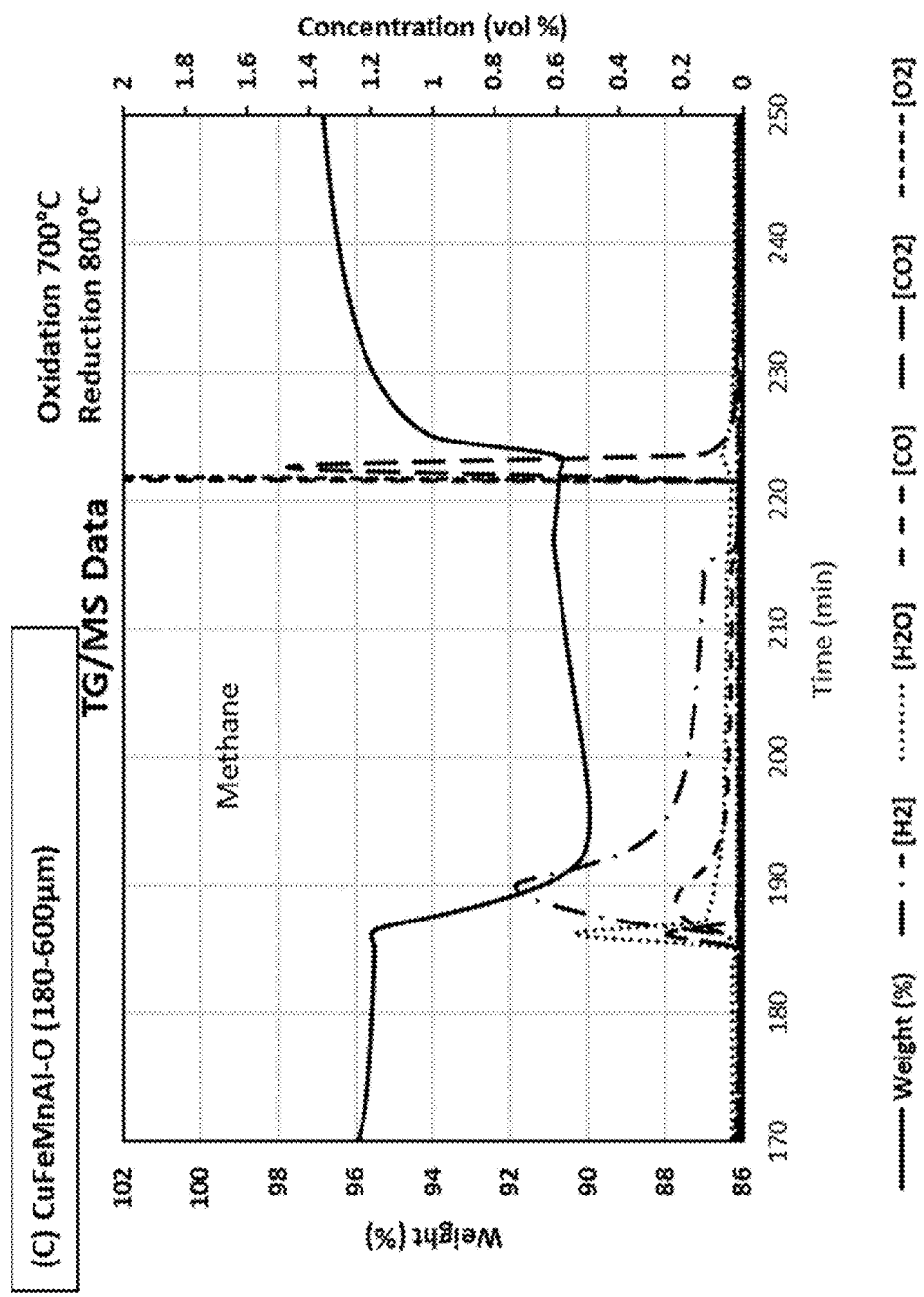

FIG. 6B shows that the reaction of methane with 100% $CuFeMnAlO_4$ produced a high concentration of $CO_2$ and $H_2O$ initially followed by rapid production of CO and $H_2$. $H_2$ concentration was significantly higher than CO indicating methane pyrolysis. CO and $H_2$ production stopped after a short time.

Data for the reaction between methane and a mixture of 1:2 $CaFe_2O_4$ mixed with $CuFeMnAlO_4$ is shown in FIG. 6B. As shown in FIG. 6B, the $H_2$ and CO production were faster than that with 100% $CaFe_2O_4$, with the syngas production lasting for a longer period than that with 100% CuFeMnAlO_4$. Higher weight changes were also observed with the mixed oxygen carriers than with reactions with either pure oxygen carrier. The data in FIGS. 6A-C indicate a synergetic effect of the combination of the two oxygen carriers for production of syngas.

When air was introduced, a large $CO_2$ peak was observed in the reaction with pure $CuFeMnAlO_4$ (FIG. 6C), with a much lower $CO_2$ peak observed in the reaction with the dual oxygen carrier system (FIG. 6B). The mixed oxides contributed to lower carbon formation during the syngas production contributing to lower $CO_2$ formation during subsequent air oxidation.

Example III

Tests were next performed to measure oxygen carrier low temperature reactivity between approximately 400° C. and approximately 600° C. using TGA. For these experiments, 60 mg of combined oxygen carriers were placed in the TGA pan and heated to reaction temperature in Ar. Then 50 vol % $H_2$ in Ar was introduced and weight change as function of time was monitored. Steam (2 vol %) was then introduced for oxidation after an inert purge. Oxygen carriers for these experiments consisted of $CaFe_2O_4$, $CuFeAlO_4$, $CuFe_{1.5}Al_{0.5}O_4$, and $CuFeMnAlO_4$, with the data from these tests shown in FIGS. 7A-C.

Figure 7A:
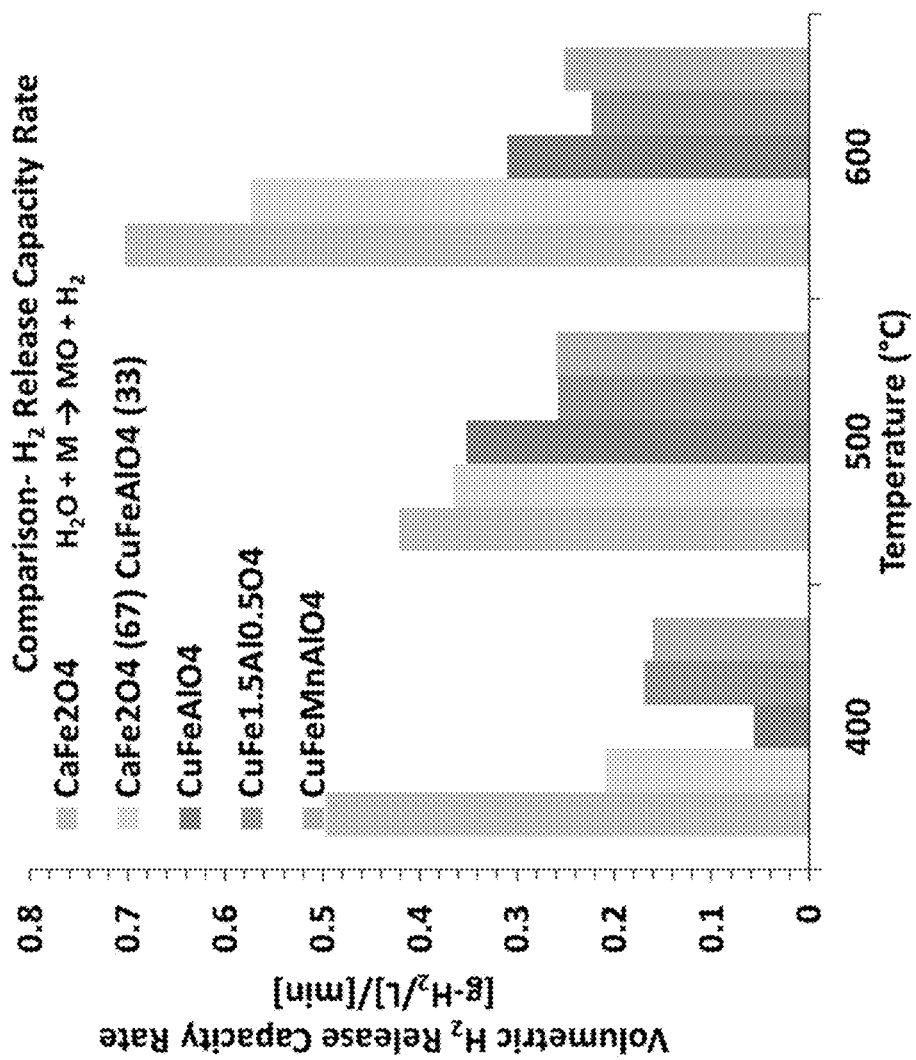
FIGS. 7A-7C depict graphs of oxygen carrier low temperature reactivity determined by TGA between approximately 400° C. and approximately 600° C., with FIG. 7A showing a graph of volumetric $H_2$ release capacity rate, FIG. 7B showing volumetric $H_2$ uptake capacity rate, and FIG. 7C showing time relative volumetric $H_2$ carrying capacity, in accordance with the features of the present invention.
Figure 7B:
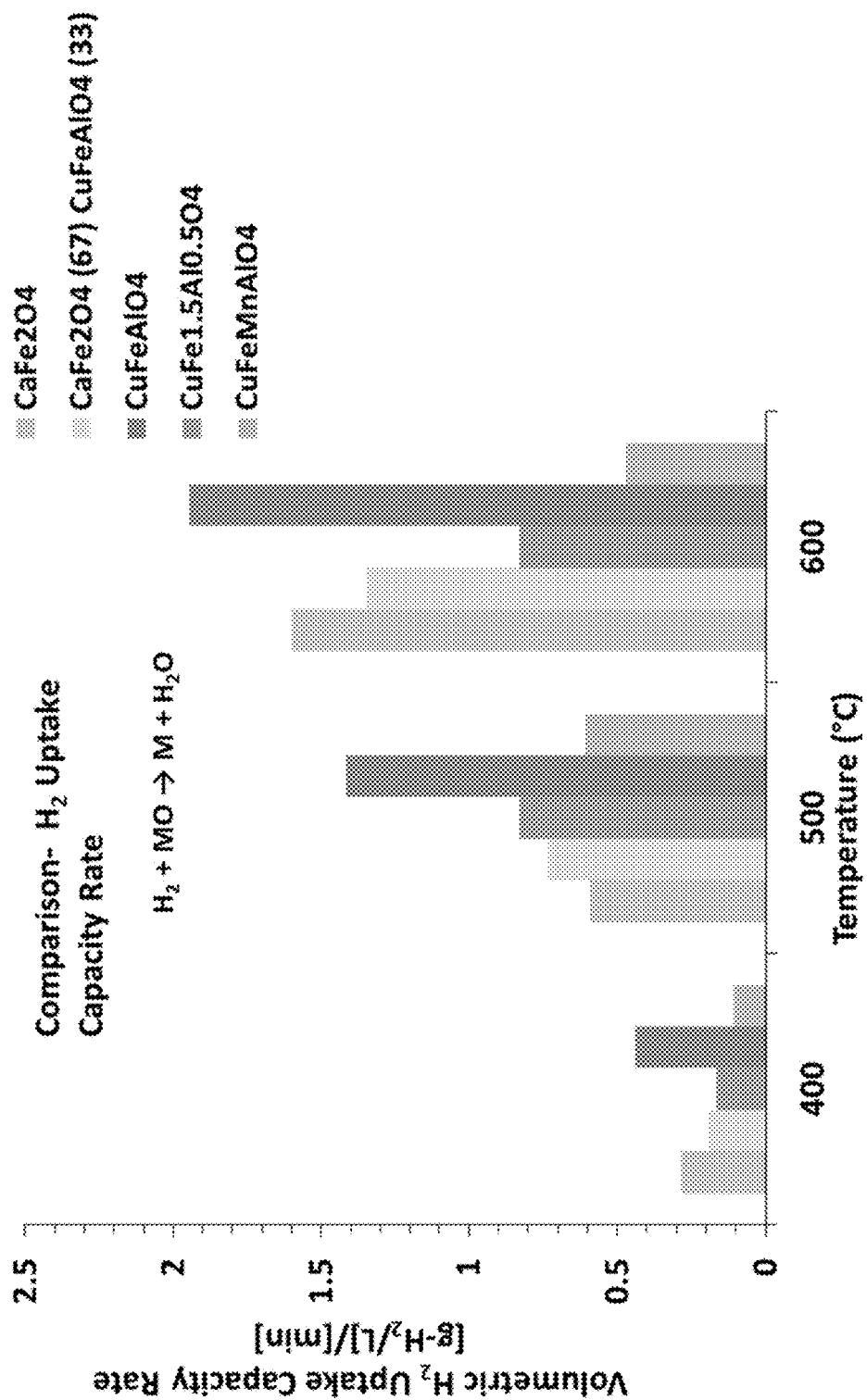
Figure 7C:
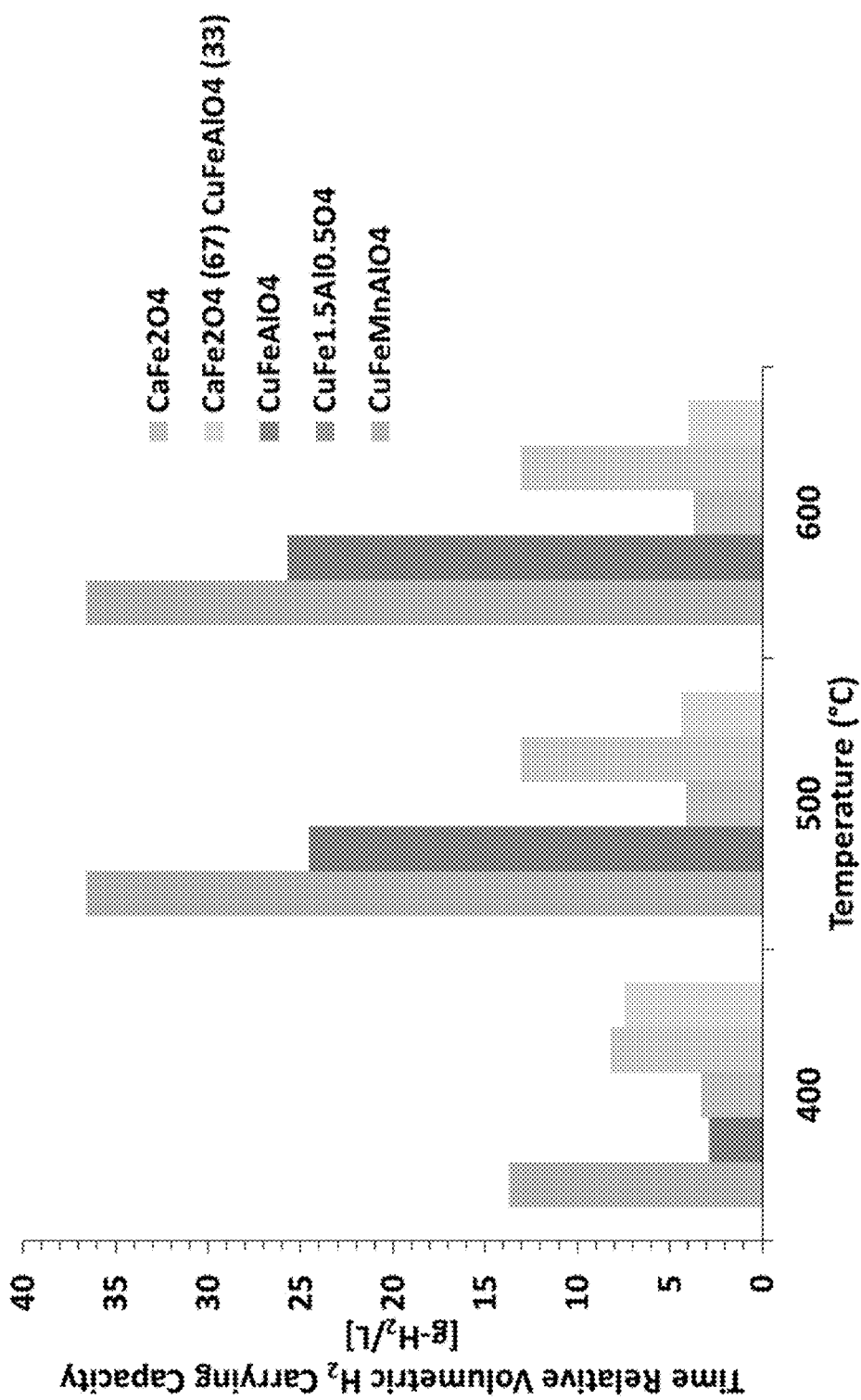

Weight change data from TGA experiments where single and mixed oxygen carriers were reacted with 50 vol % $H_2$ then re-oxidized with 2 vol % $H_2O$, were used to determine the materials $H_2$ carrying capacity and relative rates of uptake and release as shown in FIGS. 7A-C. Capacity increases with temperature from 400° C.-600° C., with $CaFe_2O_4$ having the highest potential followed by $CuFe_{1.5}Al_{0.5}O_4 > CuFeAlO_4 > CuFeMnAlO_4$. Results of oxygen carrier mixtures were extrapolated based on parent oxide species contributions. The data clearly shows that the materials exhibit comparable capacity to other conventional methods which can range from 15-40 g-$H_2$/L.

Example IV

In the following examples, laboratory-scale fixed-bed reactor studies were performed using a Micromeritics model Autochem 2910 atmospheric flow reactor at 14.7 psi ($1.01 \times 10^5$ Pa), with outlet gas stream composition analyzed using a Pfeiffer Vacuum Omnistar mass spectrometer.

Fixed bed flow reactor studies were first performed on the reduction of oxygen carriers with 20% methane in He at 800° C. and oxidation of with 20% steam at 800° C. followed by air oxidation at 750° C. To perform these tests, a 1 g sample of oxygen carrier (500 mg of $CaFe_2O_4$ dispersed in 500 mg of alumina) was placed in the reactor and heated to 750-850° C. in a flow of 20% methane in helium was introduced for reduction. After purging the system with helium, steam was introduced for oxidation. After steam, air was introduced for full oxidation. Multicycle tests were conducted using the similar sequence of reduction with 20% methane, followed by a purge with $N_2$, followed by oxidation with 20% steam, followed by air oxidation, followed by an $N_2$ purge after each cycle. Gas flow rates were 25 sccm.

FIGS. 8A-C show effluent gas concentrations during these fixed bed flow reactor tests with methane and 100% $CaFe_2O_4$ as the oxygen carrier (FIG. 8A), a 2:1 mixture by weight of $CaFe_2O_4$ and $CuFeMnAlO_4$ as the oxygen carrier (FIG. 8B) and 100% $CuFeMnAlO_4$ as the oxygen carrier (FIG. 8C). As shown in FIG. 8A, the reaction of methane with 100% $CaFe_2O_4$ mainly produced $H_2$ and CO when 20% $CH_4$ was introduced at 800° C. The rates of $H_2$ and CO production in that reaction were very low as indicated by the low initial concentrations. As shown in FIG. 8C, the reaction of methane with 100% $CuFeMnAlO_4$ initially produced combustion products ($CO_2$) rapidly with the production of $H_2$ and CO increasing following the combustion reaction. FIG. 8C shows CO production continued only for a short time but $H_2$ continued to increase due to methane pyrolysis. As shown in FIG. 8B, the reaction of methane with a 67% $CaFe_2O_4$ and 33% $CuFeMnAlO_4$ resulted in $H_2$ and CO production that was significantly higher than that with pure $CaFe_2O_4$. Further, as shown in FIG. 8B, the concentrations of $H_2$ and CO the concentrations continued to increase for a long period which is different from the reaction of methane that with pure $CuFeMnAlO_4$ (FIG. 8C). The data indicate that the dual oxygen carrier system described herein provides synergetic effects that produces more syngas with less $CO_2$ for longer than either oxygen carrier used by itself.

Example V

A fixed bed flow reactor tests was next performed using 1 g wood as fuel with a mixture of 8 g of $CaFe_2O_4$ and 1 g of $CuFeAlO_4$ and as the oxygen carrier. To perform this test, the wood and oxygen carrier were placed in the reactor. Then a temperature ramp was conducted in He up to 850° C. When CO in the effluent gas from the reactor was below 500 ppm after reaching the 850° C., 20% steam was added to the reactor. After introduction of the steam, when $H_2$ in the effluent gas from the reactor was below 5000 ppm, the reactor was cooled to 750° C. and air introduced. Gas flow rates were 100 sccm. Data from this test are shown in FIGS. 9A and 9B.

FIG. 9A shows that during the temperature ramp up, wood and the oxygen carriers reacted to form $CO_2$ and CO as shown in. When steam was introduced to the reduced oxygen carrier after the reaction with wood, rapid production of $H_2$ was observed as shown in FIG. 9B. The data indicated that biomass can be used for the $H_2$ production with the process with the combined oxygen carriers.

FIGS. 10A-0B shows concentrations of $H_2$ and CO respectively during a 28-cycle reduction of a 33% CuFeMnAlO$_4$ 67% $CaFe_2O_4$ mixture as oxygen carriers with 20% methane in He. In this example, a cycle was separated into three reaction intervals: reduction, steam oxidation, and air oxidation separated by an inert gas reaction chamber purge. The oxygen carrier mixture was first reduced with 20% $CH_4$ for an 80 minute interval at 850° C. Following reduction, the carrier mixture was oxidized with 20% steam ($H2O_v$) for a 180 minute interval. Following steam oxidation, the carrier material was oxidized with air at the same isothermal temperature for 35 minutes, representing the closure of one full cycle. Between reaction intervals the reactor was purged with Helium for 10 minutes. The cycle test was repeated 28 times with the same carrier material in a single uninterrupted test. FIG. 10C shows the concentration of $H_2$ during steam oxidation of the reduced oxygen carriers following the reduction with methane. The data shown in FIGS. 10A-C indicated that a stable performance of syngas production during methane reduction and $H_2$ production during steam oxidation can be achieved.

One or more embodiments of the provided invention include a process of production of $H_2$ using a physical mixture of a first oxygen carrier comprising a group II metal ferrite which promotes the partial oxidation of fuel and a second oxygen carrier capable of fully combusting the fuel, wherein the process does not require an external heat source and contributes to an autothermal operation. In embodiments, excess heat generated by incorporation of the second oxygen carrier allows a hydrogen production steam oxidation reactor to be decoupled from a fuel reactor and an air oxidation reactor used in performing the instant invention. In embodiments, the heat integration of the process allows $H_2$ production at a separate site where $H_2$ is needed by safely transporting the combination of reduced oxygen carriers while avoiding transport of high-pressure hydrogen cylinders or liquified hydrogen cylinders. In embodiments using methane as fuel, the first oxygen carrier (group II metal ferrite) produces syngas during the reduction step. In embodiments, providing the second oxygen carrier enhances the production rate of syngas. In embodiments, the process produces pure $H_2$ and syngas suitable for chemical processes not diluted with nitrogen. In embodiments, the invented process does not produce additional $CO_2$ because it does not require an external heat source. In embodiments, the invented process also works with biomass contributing to negative $CO_2$ emissions while producing pure $H_2$. Stable performance was observed during multi cycle tests. Group II ferrites and second oxygen carrier materials are low cost and environmentally safe Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A method for producing hydrogen from a fuel comprising:
reacting the fuel with a fully oxidized first oxygen carrier and a fully oxidized second carrier in a fuel reactor to produce gaseous products and a reduced first oxygen carrier and a reduced second oxygen carrier, wherein the fully oxidized first oxygen carrier is $CaFe_2O_4$ and the fully oxidized second oxygen carrier is $CuFeMnAlO_4$;
removing a first portion of each of the reduced first oxygen carrier and the reduced second oxygen carrier from the fuel reactor and dividing said first portion into a second portion and a third portion;
reacting the second portion with air in an air reactor to generate heat and a regenerated fully oxidized first oxygen carrier and a regenerated fully oxidized second oxygen carrier;
transporting the regenerated fully oxidized first oxygen carrier and the regenerated fully oxidized second oxygen carrier and at least a portion of the heat from the air reactor to the fuel reactor; and
reacting the third portion with steam in a steam reactor to generate hydrogen and a partially oxidized reduced first oxygen carrier and a partially oxidized second oxygen carrier.

2. The method of claim 1 wherein the heat generated and transferred from the air reactor renders the method autothermal and without the need for external input of heat.

3. The method of claim 1 wherein the gaseous products are selected from the group consisting of: syngas, $H_2$, CO, $CO_2$, and combinations thereof.

4. The method of claim 1 wherein the gaseous products are at least 50 vol. % CO and $H_2$.

5. The method of claim 1 wherein the gaseous products are at least 90 vol. % CO and $H_2$.

6. The method of claim 1 wherein the fuel comprises a combustible material selected from the group consisting of methane, natural gas, syngas, hydrogen, flare gas, land fill gas, coal, biomass, municipal waste, plastics, and combinations thereof.

7. The method of claim 1 wherein the step of reacting the fuel is performed at a reducing temperature ranging between approximately 400° C. to approximately 1100° C.

8. The method of claim 1 wherein the step of reacting the second portion of the reduced first oxygen carrier and the reduced second oxygen carrier with air is performed at an oxidizing temperature ranging from 600° C. to approximately 1100° C.

9. A method for producing hydrogen from a fuel comprising:
reacting the fuel with a fully oxidized first oxygen carrier and a fully oxidized second carrier in a fuel reactor to produce gaseous products and a reduced first oxygen carrier and a reduced second oxygen carrier;
removing a first portion of each of the reduced first oxygen carrier and the reduced second oxygen carrier from the fuel reactor and dividing said first portion into a second portion and a third portion;
reacting the second portion with air in an air reactor to generate heat and a regenerated fully oxidized first oxygen carrier and a regenerated fully oxidized second oxygen carrier;
transporting the regenerated fully oxidized first oxygen carrier and the regenerated fully oxidized second oxygen carrier and at least a portion of the heat from the air reactor to the fuel reactor, wherein the fuel reactor and air reactor comprise a chemical looping system and the steam reactor is decoupled from said chemical looping system; and
reacting the third portion with steam in a steam reactor to generate hydrogen and a partially oxidized reduced first oxygen carrier and a partially oxidized second oxygen carrier.

10. The method of claim 9 wherein the fully oxidized first oxygen carrier comprises a group II metal ferrite having the general formula $M_zFe_xO_y$, wherein M is an alkali earth metal selected from the group consisting of Mg, Ca, Ba, Sr, and combinations thereof, and wherein $1 \leq z \leq 3$, $1 \leq x \leq 3$, and $1 \leq y \leq 5$.

11. The method of claim 9 wherein the fully oxidized second oxygen carrier comprises a transition metal oxide having the general formula $A_{3-z}B_{z-x}C_xO_{4+\delta}$, wherein $0 \leq z \leq 3$, $0 \leq x \leq 3$, $\delta$ is $\pm 2$, wherein A is a transition metal selected from the group consisting of Cu, Fe, Mn, Ni, Co, Cr, and combinations thereof, wherein B is a transition metal selected from the group consisting of Fe, Mn, Al, and combinations thereof, and C is a transition metal selected from the group consisting of Fe, Mn, Al, and combinations thereof.

12. The method of claim 9 wherein the fully oxidized first oxygen carrier is $CaFe_2O_4$ and the fully oxidized second oxygen carrier is $CuFeMnAlO_4$.

13. The method of claim 9 wherein the heat generated and transferred from the air reactor renders the method autothermal and without the need for external input of heat.

14. The method of claim 9 wherein the gaseous products are selected from the group consisting of: syngas, $H_2$, CO, $CO_2$, and combinations thereof.

15. The method of claim 9 wherein the gaseous products are at least 50 vol. % CO and $H_2$.

16. The method of claim 9 wherein the gaseous products are at least 90 vol. % CO and $H_2$.

17. The method of claim 9 wherein the fuel comprises a combustible material selected from the group consisting of methane, natural gas, syngas, hydrogen, flare gas, land fill gas, coal, biomass, municipal waste, plastics, and combinations thereof.

18. The method of claim 9 wherein the step of reacting the fuel is performed at a reducing temperature ranging between approximately 400° C. to approximately 1100° C.

19. The method of claim 9 wherein the step of reacting the second portion of the reduced first oxygen carrier and the reduced second oxygen carrier with air is performed at an oxidizing temperature ranging from 600° C. to approximately 1100° C.

* * * * *